(12) United States Patent
Horibe

(10) Patent No.: US 7,215,632 B2
(45) Date of Patent: May 8, 2007

(54) SIGNAL PROCESSING APPARATUS AND SIGNAL PROCESSING METHOD

(75) Inventor: Ryusuke Horibe, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 583 days.

(21) Appl. No.: 10/479,275

(22) PCT Filed: Mar. 11, 2003

(86) PCT No.: PCT/JP03/02835

§ 371 (c)(1),
(2), (4) Date: Dec. 2, 2003

(87) PCT Pub. No.: WO03/077248

PCT Pub. Date: Sep. 18, 2003

(65) Prior Publication Data

US 2004/0172148 A1    Sep. 2, 2004

(30) Foreign Application Priority Data

Mar. 11, 2002   (JP)   ............................ 2002-064879

(51) Int. Cl.
*G11B 7/00*   (2006.01)
(52) U.S. Cl. .............................. 369/124.11; 369/44.29; 369/44.35; 369/124.05
(58) Field of Classification Search ............... None
See application file for complete search history.

(56) References Cited

U.S. PATENT DOCUMENTS

| | | | | |
|---|---|---|---|---|
| 5,587,975 A | * | 12/1996 | Kobayashi | 369/13.02 |
| 5,719,843 A | * | 2/1998 | Nakajima et al. | 369/124.05 |
| 5,777,967 A | | 7/1998 | Ishibashi et al. | |
| 6,069,866 A | * | 5/2000 | Pietruszynski et al. | 369/124.11 |
| 6,104,682 A | * | 8/2000 | Konishi | 369/124.14 |
| 6,341,113 B1 | * | 1/2002 | Kamiyama | 369/44.29 |
| 6,434,098 B2 | * | 8/2002 | Konishi et al. | 369/124.14 |
| 6,674,707 B2 | * | 1/2004 | Ogura et al. | 369/124.01 |
| 2001/0055251 A1 | | 12/2001 | Konishi et al. | |

FOREIGN PATENT DOCUMENTS

| | | |
|---|---|---|
| JP | 5-46991 | 2/1993 |
| JP | 6-187654 | 7/1994 |
| JP | 8-96361 | 4/1996 |
| JP | 9-259544 | 10/1997 |
| JP | 10-31821 | 2/1998 |
| JP | 3067298 | 5/2000 |
| JP | 2002-15422 | 1/2002 |
| JP | 2002-319239 | 10/2002 |

\* cited by examiner

*Primary Examiner*—Thang V. Tran
(74) *Attorney, Agent, or Firm*—Wenderoth, Lind & Ponack, L.L.P.

(57) ABSTRACT

An optical disc system comprises a gain offset unit for giving a gain and an offset to an inputted reproduction signal, an A/D converter, a peak detector, a bottom detector, an amplitude detector for calculating a signal, an offset detector for calculating a signal offset, a dropout detector for detecting a dropout in the input signal, and a controller for performing gain control and offset control of the gain offset unit, the controller being able to hold the control operation or switch the control speed by a hold signal that is supplied from the outside, wherein a defect in a recording medium is detected to hold the gain control and offset control or change the control response speed, whereby the signal amplitude and offset at the input of the A/D converter are always kept constant.

24 Claims, 24 Drawing Sheets

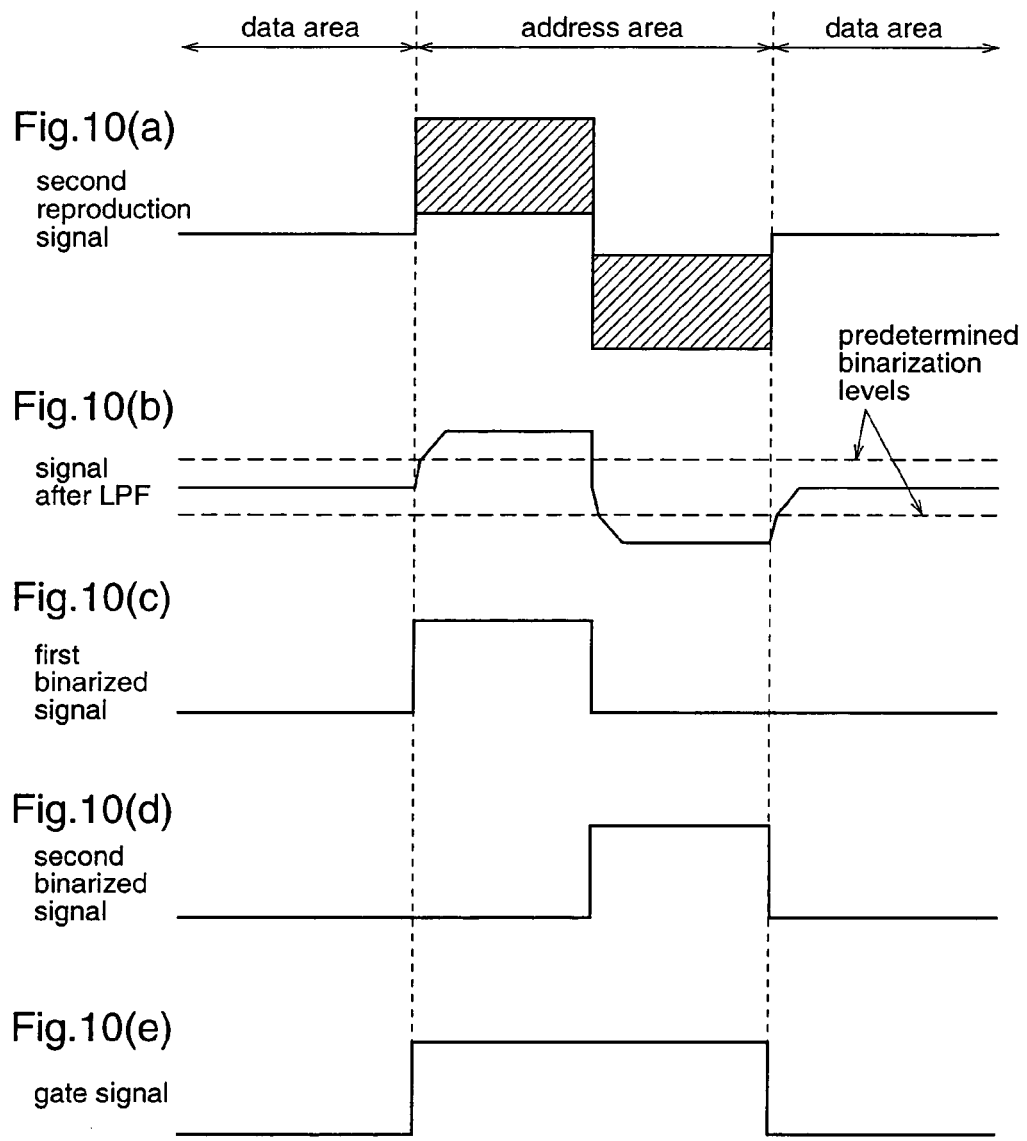

Fig.11(a)
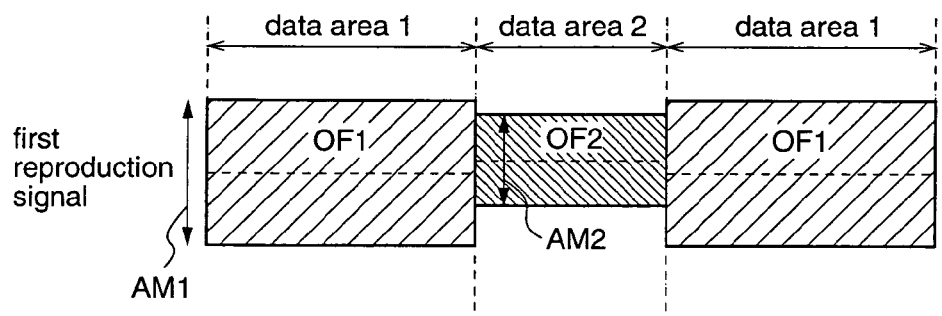
Fig.11(b)
Fig.11(c)
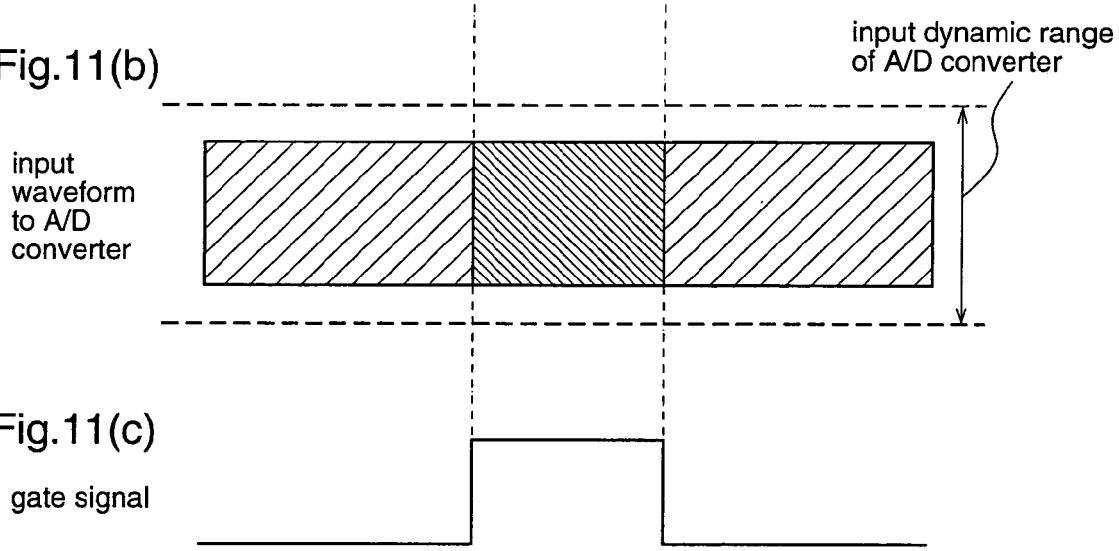

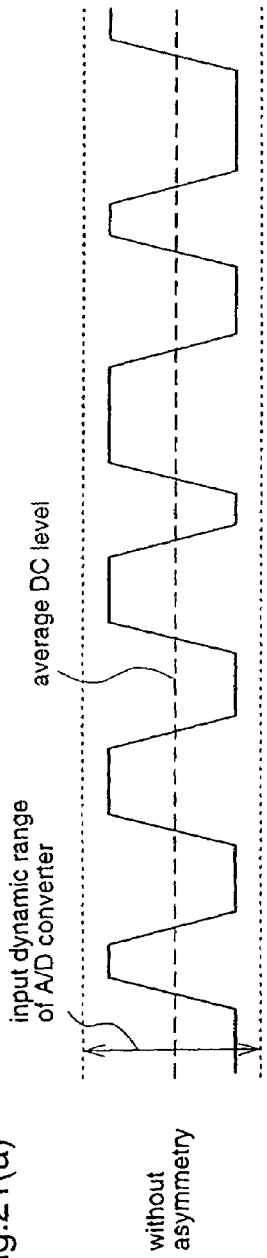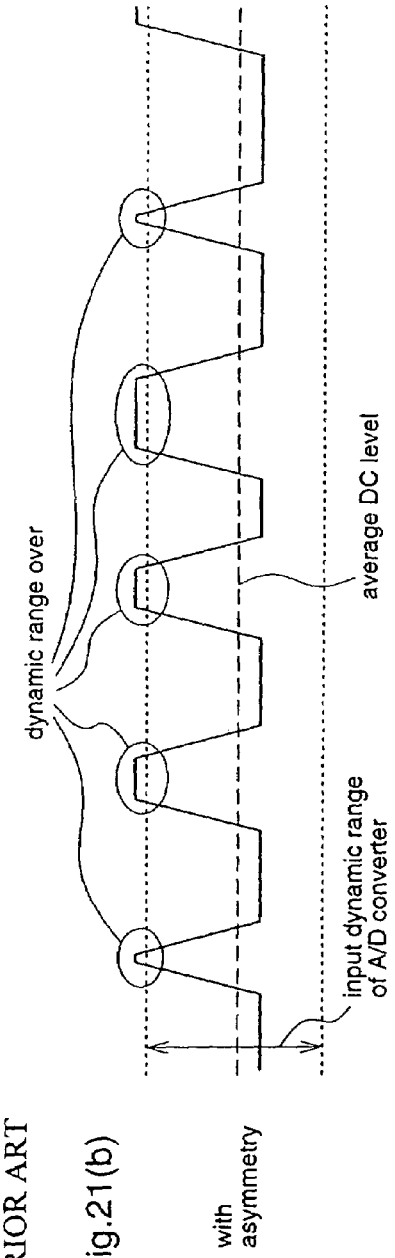
PRIOR ART
Fig.21(a) without asymmetry
PRIOR ART
Fig.21(b) with asymmetry PRIOR ART
Fig.23(a)
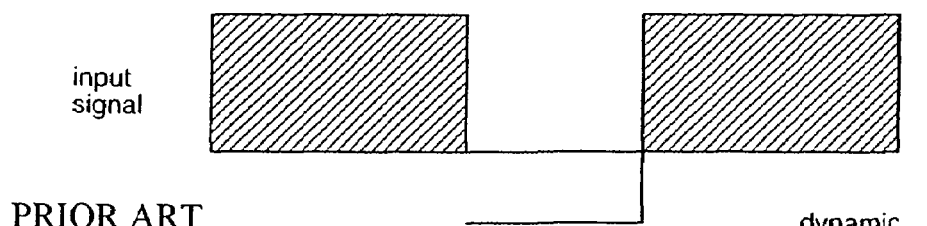
PRIOR ART
Fig.23(b)
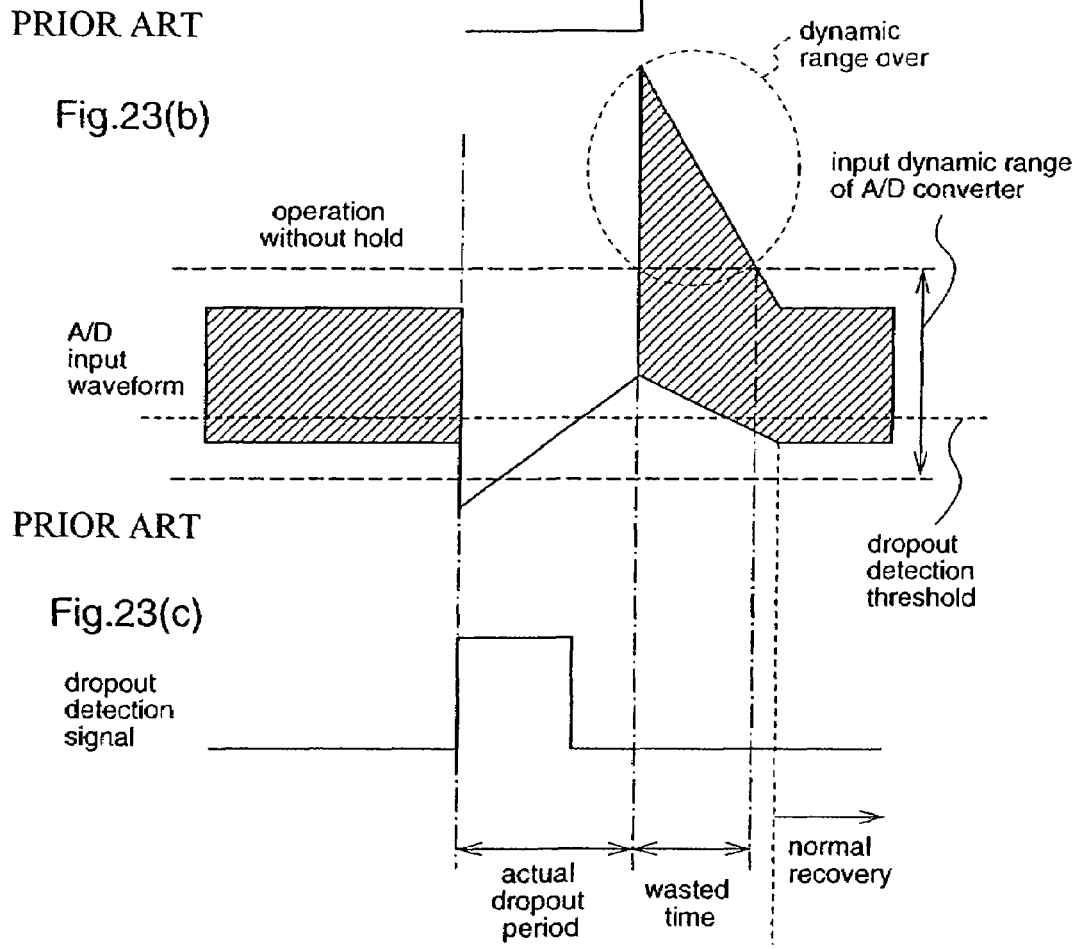
PRIOR ART
Fig.23(c)

Fig.24(a)
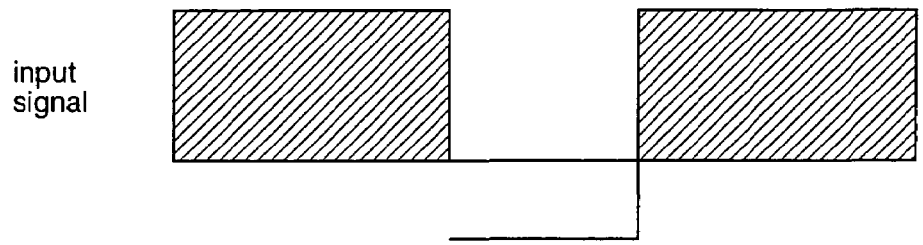
input signal
Fig.24(b)
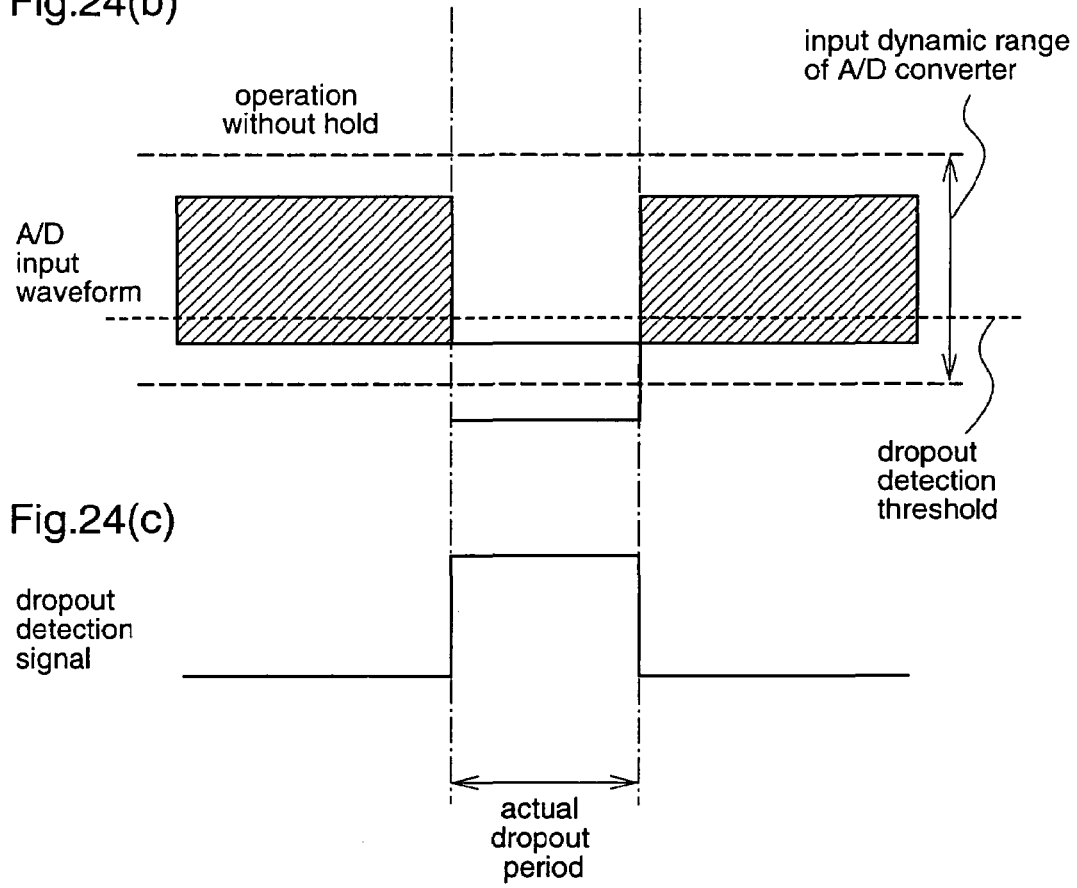
A/D input waveform
operation without hold
input dynamic range of A/D converter
dropout detection threshold
Fig.24(c)
dropout detection signal
actual dropout period

SIGNAL PROCESSING APPARATUS AND SIGNAL PROCESSING METHOD

TECHNICAL FIELD

The present invention relates to a signal processing apparatus and a signal processing method for efficiently inputting a signal into an input dynamic range of an analog-to-digital converter, in a reproduction signal processing system which performs data reproduction by analog-to-digital converting information recorded on an information recording medium.

BACKGROUND ART

In recent years, digitization of analog circuits has progressed as semiconductor processes have been shrunk, and efforts for reduction in circuit scale, improvement in circuit stability, reduction in power consumption and the like have been made. Further, support for process shrinkage is facilitated by digitization, leading to an advantage of improvement in development efficiency.

Also in the field of signal processing for optical discs, it is possible to change a signal processing circuit from an analog signal processing circuit to a digital signal processing circuit by using a technique such as PRML (Partial Response Maximum Likelihood), whereby reproduction performance is improved.

Accordingly, the conventional signal processing apparatus is required to efficiently perform analog-to-digital conversion (hereinafter referred to as A/D conversion) at a part that performs A/D conversion, that is, it is required to convert an analog signal into a digital signal at a maximum amplitude within a dynamic range of an A/D converter.

FIG. 20 is a block diagram illustrating a conventional signal processing apparatus of this type.

The conventional signal processing apparatus comprises a high-pass filter 101 which cuts off low-frequency bands of an input reproduction signal to remove a DC offset; a variable gain amplifier 1 which gives a gain based on an inputted gain control signal to the inputted reproduction signal from which the DC offset is removed by the high-pass filter 101; an A/D converter 3 which receives the output signal from the variable gain amplifier 1, and subjects the signal to A/D conversion; a peak detector 4 which performs peak detection from sampling data obtained by the A/D converter 3; a bottom detector 5 which performs bottom detection from the sampling data; an amplitude detector 6 which calculates a signal amplitude at the input of the A/D converter on the basis of the detected peak value and bottom value; and a gain controller 8 which controls the variable gain amplifier 1 so as to make the A/D input amplitude constant, on the basis of the amplitude information obtained by the amplitude detector 6.

In the above-mentioned construction, the signal amplitude at the input of the A/D converter 3 is detected, and feedback control is carried out to make the signal amplitude constant, whereby the input signal to the A/D converter 3 can be effectively nestled in the dynamic range of the A/D converter 3.

By the way, there is a DC free method as a recording modulation method for an information recording medium such as an optical disc. In this method, recording is carried out so that the ratio of "H" period to "L" period of a signal becomes 50:50.

However, when the recording modulation method for the information recording medium is not DC free or when recording marks are formed in lengths longer or shorter than original lengths due to variations in the manufacturing stage of the information recording medium although the DC free method is employed, the ratio of "H" period to "L" period of the signal deviates from 50:50, resulting in a phenomenon that the average DC level of the reproduction signal deviates from the center position between the upper and lower peaks of the reproduction signal. This phenomenon frequently occurs when the recording condition is not optimized, and it is generally called "asymmetry". When a reproduction signal having asymmetry passes through the high-pass filter 101, the DC component is cut off, and a DC offset is generated in the input signal of the A/D converter 3 as shown in FIG. 21. As the DC offset increases, the reproduction signal waveform undesirably exceeds the input dynamic range of the A/D converter 3, and a portion of the waveform is lost, whereby correct A/D conversion cannot be carried out.

However, this problem can be solved by a second prior art that is disclosed in, for example, Patent Document 1 to be described later. FIG. 22 is a block diagram illustrating a signal processing apparatus disclosed in Patent Document 1, which is appropriately rewritten so as to facilitate correlation with the block construction shown in FIG. 21.

The signal processing apparatus according to the second prior art comprises a variable gain-amplifier 1 which gives a gain based on an inputted gain control signal to an inputted reproduction signal; an offset unit 2 which gives a DC offset based on an inputted offset control signal to the output of the variable gain amplifier 1; an A/D converter 3 which performs A/D conversion for the output of the offset unit 2; a peak detector 4 which performs peak detection from sampling data obtained by the A/D converter 3; a bottom detector 5 which performs bottom detection from the sampling data; an amplitude detector 6 which calculates a signal amplitude at the input of the A/D converter 3 on the basis of the detected peak value and bottom value; an offset detector 7 which calculates a center value of the input to the A/D converter on the basis of the average of the detected peak value and the detected bottom value; a gain controller 8 which controls the variable gain amplifier 1 so as to make the A/D input amplitude constant, on the basis of the amplitude information obtained by the amplitude detector 6; and an offset controller 9 which performs control so that the center of the A/D input signal matches the center of the input dynamic range of the A/D converter 3, on the basis of the offset information obtained by the offset detector 7.

In this prior art, there are provided two control loops, i.e., a control loop for detecting the signal amplitude at the input of the A/D converter 3 to make the signal amplitude constant, and a control loop for detecting the center value of the input signal to perform offset control, whereby the signal amplitude and offset of the input signal to the A/D converter 3 are controlled so that the input signal can be efficiently nestled in the input dynamic range of the A/D converter.

Patent Document 1: Japanese Patent No. 3067298 (Pages 7–11, FIGS. 2 and 4)

However, in the case where the input signal drops as shown in FIG. 23(a) due to an adherent such as dust or a flaw on the information recording medium, because both of the gain and the offset are controlled in the second prior art described above, the gain of the variable gain amplifier 1 increases at the signal dropout portion, and the offset unit 2 is operated to return the signal back to the center, resulting in a signal having a waveform as shown in FIG. 23(b) at the input of the A/D converter 3. As seen from FIG. 23, after the reproduction signal has passed through the signal dropout portion, there occurs a wasted time from when the reproduction signal exceeds the input dynamic range of the A/D converter 3 to when the reproduction signal is pulled into the normal state where it is nestled in the input dynamic range, and data reproduction cannot be normally carried out during this time period. For example, when there is a dropout of 2 mm, a waveform abnormality continues actually for a time period equivalent to 3 mm due to the wasted time, leading to a reduction in reproduction performance.

Furthermore, since the bottom of the reproduction signal gradually approaches the center of the input dynamic range of the A/D converter 3 by offset control during the dropout period, when a result of comparison between the output of the peak detector 4 and a predetermined threshold is adopted as a dropout detection signal, the dropout detection signal is interrupted at some midpoint in the signal dropout period as shown in FIG. 23(c), whereby holding of a subsequent PLL (Phase Locked Loop) circuit or a peripheral circuit for such as focus control or tracking control cannot be correctly carried out.

Furthermore, in the above-described prior art, both of the gain and the offset must be controlled, resulting in an increase in circuit scale as well as an increase in power consumption.

The present invention is made to solve the above-described problems and has for its object to provide a signal processing apparatus and a signal processing method that can suppress a phenomenon in which a reproduction signal exceeds an input dynamic range of an A/D converter after passing through a signal dropout period, and that can improve precision of dropout detection.

DISCLOSURE OF THE INVENTION

In order to achieve the above-mentioned object, the present invention comprises a gain offset unit for giving a gain based on an inputted gain control signal and a DC offset based on an inputted offset control signal to an inputted reproduction signal; an A/D converter for receiving the output of the gain offset unit, sampling the input signal with a clock having a predetermined clock cycle T, and analog-to-digital converting the signal, thereby to output sampling data; a peak detector for receiving the output of the A/D converter, and performing peak detection with a clock having a cycle that is m times (m: positive integer) as long as the clock cycle T; a bottom detector for receiving the output of the A/D converter, and performing bottom detection with a clock having a cycle that is n times (n: positive integer) as long as the clock cycle T; an amplitude detector for receiving the output of the peak detector and the output of the bottom detector, and calculating a signal amplitude of the input to the A/D converter, thereby to output an amplitude information signal; an offset detector for receiving the output of the peak detector and the output of the bottom detector, and calculating a signal offset at the input of the A/D converter, thereby to output an offset information signal; a dropout detector for receiving at least one of the output of the A/D converter, the output of the bottom detector, the output of the offset detector, and the amplitude information signal, and detecting a dropout in the input signal to output a hold signal; and a controller for performing gain control and offset control of the gain offset unit on the basis of the amplitude information signal and the offset information signal, said controller being able to hold the control operation or change the control speed according to an inputted hold signal. In the above-described construction, a local fluctuation that occurs in the reproduction signal due to a defect or the like on the recording medium is detected, and the gain control and offset control are held or the control response speed is changed on the basis of the local fluctuation, whereby the phenomenon in which the reproduction signal exceeds the input dynamic range of the A/D converter after passing through the defect can be suppressed, and the signal amplitude and offset at the input of the A/D converter can always be kept approximately constant.

Further, the present invention comprises a variable gain amplifier for giving a gain based on an inputted gain control signal to an inputted reproduction signal; an offset unit for receiving the output of the variable gain amplifier, and applying a DC offset based on an inputted offset control signal to the input signal; an A/D converter for receiving the output of the offset unit, sampling the input signal with a clock having a predetermined clock cycle T, and analog-to-digital converting the signal, thereby to output sampling data; a peak detector for receiving the output of the A/D converter, and performing peak detection using a clock having a cycle that is m times (m: positive integer) as long as the clock cycle T; a bottom detector for receiving the output of the A/D converter, and performing bottom detection using a clock having a cycle that is n times (n: positive integer) as long as the clock cycle T; an amplitude detector for receiving the output of the peak detector and the output of the bottom detector, and calculating a signal amplitude of the input to the A/D converter, thereby to output an amplitude information signal; an offset detector for receiving the output of the peak detector and the output of the bottom detector, and calculating a signal offset of the input to the A/D converter, thereby to output an offset information signal; a dropout detector for receiving at least one of the output of the A/D converter, the output of the peak detector, the output of the bottom detector, the output of the offset detector, and the amplitude information signal, and detecting a dropout in the input signal to output a hold signal; a gain controller for controlling the variable gain amplifier on the basis of a result of comparison between the amplitude information signal and a target amplitude value, said controller being able to hold the gain control operation or change the control speed according to an inputted hold signal; an offset controller for controlling the offset unit on the basis of a result of comparison between the offset information signal and a target offset value, said controller being able to hold the offset control operation or change the control speed according to the inputted hold signal. In the above-described construction, a local fluctuation that occurs in the reproduction signal due to a defect or the like on the recording medium is detected, and the gain control and offset control are held or the control response speed is changed on the basis of the local fluctuation, whereby the phenomenon in which the reproduction signal exceeds the input dynamic range of the A/D converter after passing through the defect can be suppressed, and the signal amplitude and offset at the input of the A/D converter can always be kept approximately constant.

Further, the present invention comprises a gain offset unit for giving a gain based on an inputted gain control signal and a DC offset based on an inputted offset control signal to an input reproduction signal; an A/D converter for receiving the output of the gain offset unit, sampling the input signal with a clock having a predetermined clock cycle T, and analog-to-digital converting the signal, thereby to output sampling data; a peak detector for receiving the output of the A/D converter, and performing peak detection using a clock having a cycle that is m times (m: positive integer) as long as the clock cycle T; a bottom detector for receiving the output of the A/D converter, and performing bottom detection using a clock having a cycle that is n times (n: positive integer) as long as the clock cycle T; an amplitude detector for receiving the output of the peak detector and the output of the bottom detector, and calculating a signal amplitude of the input to the A/D converter, thereby to output an amplitude information signal; an offset detector for receiving the output of the peak detector and the output of the bottom detector, and calculating a signal offset of the input to the A/D converter, thereby to output an offset information signal; a dropout detector for receiving at least one of the output of the A/D converter, the output of the peak detector, the output of the bottom detector, the output of the offset detector, and the amplitude information signal, and detecting a dropout in the input signal to output a hold signal; a controller for performing gain control and offset control of the gain offset unit on the basis of the amplitude information signal and the offset information signal; and a PLL unit for generating a clock that is phase-locked with the sampling data outputted from the A/D converter. In the above-described construction, since the PLL clock is used as the sampling clock of the A/D converter, application to CAV (Constant Angular Velocity) playback is facilitated. Further, when the operation clocks of the peak detector and the bottom detector are 1/m and 1/n (m,n: positive integers) of the PLL clock, respectively, the operation clock frequencies are reduced, resulting in reduced power consumption. Furthermore, a local fluctuation that occurs in the reproduction signal due to a defect or the like on the recording medium is detected, and the gain control, offset control, and PLL control are held or the control response speed is changed on the basis of the local fluctuation, whereby the phenomenon in which the reproduction signal exceeds the input dynamic range of the A/D converter after passing through the defect can be suppressed, and the signal amplitude and offset at the input of the A/D converter can always be kept approximately constant, resulting in stable A/D conversion.

Further, the present invention comprises a gain offset unit for giving a gain based on an inputted gain control signal and a DC offset based on an inputted offset control signal to an inputted first reproduction signal; an A/D converter for receiving the output of the gain offset unit and a clock having a predetermined clock cycle T, sampling the input signal with the clock, and analog-to-digital converting the signal, thereby to output sampling data; a peak detector for receiving the output of the A/D converter, and performing peak detection; a bottom detector for receiving the output of the A/D converter, and performing bottom detection; an amplitude detector for receiving the output of the peak detector and the output of the bottom detector, and calculating a signal amplitude of the input to the A/D converter, thereby to output an amplitude information signal; an offset detector for receiving the output of the peak detector and the output of the bottom detector, and calculating a signal offset of the input to the A/D converter, thereby to output an offset information signal; a gate generator for receiving a second reproduction signal, and recognizing area information on the optical disc recording medium to generate a gate signal indicating present area information; and a controller for performing gain control and offset control of the gain offset unit on the basis of the amplitude information signal and the offset information signal, said gain control and offset control being performed independently for each recording area according to the gate signal. In the above-described construction, since different recording areas are detected to generate a gate signal, independent gain control and offset control can be carried out for each recording area.

Further, the present invention comprises a variable gain amplifier for giving a gain based on an inputted gain control signal to an inputted first reproduction signal; an offset unit for receiving the output of the variable gain amplifier, and giving a DC offset based on an inputted offset control signal to the input signal; an A/D converter for receiving the output of the offset unit and a clock having a predetermined clock cycle T, sampling the input signal using the clock, and analog-to-digital converting the signal, thereby to output sampling data; a peak detector for receiving the output of the A/D converter, and performing peak detection using a clock having a cycle that is m times (m: positive integer) as long as the clock cycle T; a bottom detector for receiving the output of the A/D converter, and performing bottom detection using a clock having a cycle that is n times (n: positive integer) as long as the clock cycle T; an amplitude detector for receiving the output of the peak detector and the output of the bottom detector, and calculating a signal amplitude of the input to the A/D converter, thereby to output an amplitude information signal; an offset detector for receiving the output of the peak detector and the output of the bottom detector, and calculating a signal offset of the input to the A/D converter, thereby to output an offset information signal; a gate generator for receiving a second reproduction signal, and recognizing area information on the optical disc recording medium to generate a gate signal indicating present area information; a gain controller for controlling the variable gain amplifier on the basis of a result of comparison between the amplitude information signal and a target amplitude value, said controller performing independent amplitude control for each recording area according to the gate signal; at least one gain storage unit for holding gain control values outputted from the gain controller; and an offset controller for controlling the offset unit on the basis of a result of comparison between the amplitude information signal and the target amplitude value. In the above-described construction, since different recording areas are detected to generate a gate signal, independent gain control and offset control can be carried out for each recording area.

Further, the present invention comprises a variable gain amplifier for giving a gain based on an inputted gain control signal to an inputted first reproduction signal; an offset unit for receiving the output of the variable gain amplifier, and giving a DC offset based on an inputted offset control signal to the input signal; an A/D converter for receiving the output of the offset unit and a clock having a predetermined clock cycle T, sampling the signal using the clock, and analog-to-digital converting the signal, thereby to output sampling data; a peak detector for receiving the output of the A/D converter, and performing peak detection using a clock having a cycle that is m times (m: positive integer) as long as the clock cycle T; a bottom detector for receiving the output of the A/D converter, and performing bottom detection using a clock having a cycle that is n times (n: positive integer) as long as the clock cycle T; an amplitude detector for receiving the output of the peak detector and the output of the bottom detector, and calculating a signal amplitude of the input to the A/D converter, thereby to output an amplitude information signal; an offset detector for receiving the output of the peak detector and the output of the bottom detector, and calculating a signal offset of the input to the A/D converter, thereby to output an offset information signal; a gate generator for receiving a second reproduction signal, and recognizing area information on the optical disc recording medium to generate a gate signal indicating present area information; a gain controller for controlling the variable gain amplifier on the basis of a result of comparison between the amplitude information signal and a target amplitude value; an offset controller for controlling the offset unit on the basis of a result of comparison between the offset information signal and a target offset value, said offset controller being able to perform independent offset control for each recording area on the basis of the gate signal; and at least one offset storage unit for holding offset control values outputted from the offset controller. In the above-described construction, since different recording areas are detected to generate a gate signal, independent gain control and offset control can be carried out for each recording area.

Further, the present invention comprises a variable gain amplifier for giving a gain based on an inputted gain control signal to an inputted first reproduction signal; an offset unit for receiving the output of the variable gain amplifier, and giving a DC offset based on an inputted offset control signal to the input signal; an A/D converter for receiving the output of the offset unit and a clock having a predetermined clock cycle T, sampling the input signal using the clock, and analog-to-digital converting the signal, thereby to output sampling data; a peak detector for receiving the output of the A/D converter, and performing peak detection using a clock having a cycle that is m times (m: positive integer) as long as the clock cycle T; a bottom detector for receiving the output of the A/D converter, and performing bottom detection using a clock having a cycle that is n times (n: positive integer) as long as the clock cycle T; an amplitude detector for receiving the output of the peak detector and the output of the bottom detector, and calculating a signal amplitude of the input to the A/D converter, thereby to output an amplitude information signal; an offset detector for receiving the output of the peak detector and the output of the bottom detector, and calculating a signal offset of the input to the A/D converter, thereby to output an offset information signal; a gate generator for receiving a second reproduction signal, and recognizing area information on the optical disc recording medium to generate a gate signal indicating present area information; a gain controller for controlling the variable gain amplifier on the basis of a result of comparison between the amplitude information signal and a target amplitude value, said controller performing independent amplitude control for each recording area according to the gate signal; at least one gain storage unit for holding gain control values outputted from the gain controller; an offset controller for controlling the offset unit on the basis of a result of comparison between the offset information signal and a target offset value, said controller performing independent offset control for each recording area according to the gate signal; and at least one offset storage unit for storing offset control values outputted from the offset controller. In the above-described construction, since different recording areas are detected to generate a gate signal, independent gain control and offset control can be carried out for each recording area.

Further, the present invention comprises a gain offset unit for giving a gain based on an inputted gain control signal and a DC offset based on an inputted offset control signal to an inputted reproduction signal; an equalizer for receiving the output of the gain offset unit, and emphasizing high frequency bands of the signal; an A/D converter for receiving the output of the equalizer, sampling the input signal with a clock having a predetermined clock cycle T, and analog-to-digital converting the signal, thereby to output sampling data; a peak detector for receiving the output of the A/D converter, and performing peak detection using a clock having a cycle that is m times (m: positive integer) as long as the clock cycle T; a bottom detector for receiving the output of the A/D converter, and performing bottom detection using a clock having a cycle that is n times (n: positive integer) as long as the clock cycle T; an amplitude detector for receiving the output of the peak detector and the output of the bottom detector, and calculating a signal amplitude of the input to the A/D converter, thereby to output an amplitude information signal; an offset detector for receiving the output of the peak detector and the output of the bottom detector, and calculating a signal offset of the input to the A/D converter, thereby to output an offset information signal; and a controller for performing gain control and offset control of the gain offset unit on the basis of the amplitude information signal and the offset information signal, said controller holding the control operation or changing the control speed according to an inputted hold signal. In the above-described construction, the signal amplitude and offset at the input of the equalizer can be kept approximately constant, and the signal amplitude and offset at the input of the A/D converter can be kept approximately constant.

Further, the present invention comprises a variable gain amplifier for giving a gain based on an inputted gain control signal to an inputted reproduction signal; an equalizer for receiving the output of the variable gain amplifier, and emphasizing high frequency bands of the input signal; an offset unit for receiving the output of the equalizer, and giving a DC offset based on an inputted offset control signal to the input signal; an A/D converter for receiving the output of the offset unit, sampling the input signal with a clock having a predetermined clock cycle T, and analog-to-digital converting the signal, thereby to output sampling data; a peak detector for receiving the output of the A/D converter, and performing peak detection using a clock having a cycle that is m times (m: positive integer) as long as the clock cycle T; a bottom detector for receiving the output of the A/D converter, and performing bottom detection using a clock having a cycle that is n times (n: positive integer) as long as the clock cycle T; an amplitude detector for receiving output signals from the peak detector and the bottom detector, and calculating a signal amplitude at the input of the A/D converter, thereby to output an amplitude information signal; an offset detector for receiving the output of the peak detector and the output of the bottom detector, and calculating a signal offset of the input to the A/D converter, thereby to output an offset information signal; a gain controller for controlling the variable gain amplifier on the basis of a result of comparison between the amplitude information signal and a target amplitude value; and an offset controller for controlling the offset unit on the basis of a result of comparison between the offset information signal and a target offset value. In the above-described construction, the signal amplitude at the input of the equalizer can be kept approximately constant, and the signal amplitude and offset at the input of the A/D converter can be kept approximately constant.

Further, the preset invention comprises a variable gain amplifier for giving a gain based on an inputted gain control signal to an inputted reproduction signal; an offset unit for receiving the output of the variable gain amplifier, and giving a DC offset based on an inputted offset control signal to the input signal; an equalizer for receiving the output of the offset unit, and emphasizing high frequency bands of the input signal; an A/D converter for receiving the output of the equalizer, and sampling the input signal with a clock having a predetermined clock cycle T, and analog-to-digital converting the signal, thereby to output sampling data; a peak detector for receiving the output of the A/D converter, and performing peak detection using a clock having a cycle that is m times (m: positive integer) as long as the clock cycle T; a bottom detector for receiving the output of the A/D converter, and performing bottom detection using a clock having a cycle that is n times (n: positive integer) as long as the clock cycle T; an amplitude detector for receiving the output of the peak detector and the output of the bottom detector, and calculating a signal amplitude of the input to the A/D converter, thereby to output an amplitude information signal; an offset detector for receiving the output of the peak detector and the output of the bottom detector, and calculating a signal offset of the input to the A/D converter, thereby to output an offset information signal; a gain controller for controlling the variable gain amplifier on the basis of a result of comparison between the amplitude information signal and a target amplitude value; and an offset controller for controlling the offset unit on the basis of a result of comparison between the offset information signal and a target offset value. In the above-described construction, the signal amplitude and offset at the input of the equalizer can be kept approximately constant, and the signal amplitude and offset at the input of the A/D converter can be kept approximately constant.

Further, the gain offset unit according to the present invention enables the reproduction signal to be directly input to the A/D converter without performing internal processing, whereby the absolute amplitude value of the reproduction signal can be measured by inputting the reproduction signal directly to the A/D converter.

Further, the variable gain amplifier according to the present invention enables the reproduction signal to be directly input to the A/D converter without performing internal processing, whereby the absolute amplitude value of the reproduction signal can be measured by inputting the reproduction signal to the A/D converter.

Further, the present invention further includes a servo controller for receiving the output of the amplitude detector, and learning a focus control position or a tracking control position of a pickup on the basis of the reproduction signal amplitude information, whereby a change in the amplitude of the input reproduction signal can be transferred to the output of the amplitude detector by compulsorily holding at least one of gain control and offset control during the learning.

Further, the present invention further includes a servo controller for receiving the output of the amplitude detector, and learning a focus control position or a tracking control position of a pickup on the basis of the reproduction signal amplitude information. At least one of gain control and offset control is carried out before learning, and learning operation is started after the both controls are established, and at least one of gain control and offset control is compulsorily held during the learning, whereby the reproduction signal is normalized to be approximately constant, and a change in the amplitude can be transferred to the output of the amplitude detector.

Further, the present invention provides a signal processing method comprising a step of detecting a peak value from a signal read from an information recording medium; a step of detecting a bottom value from the signal read from the information recording medium; a step of calculating a signal amplitude on the basis of the peak value and the bottom value to output an amplitude information signal; a step of detecting a dropout from the signal read from the information recording medium; and a step of controlling the ampli-tude of the input signal on the basis of the amplitude information signal; wherein, during the dropout detection, the control of the amplitude of the input signal is held or the control speed is lowered. In the above-described method, a local fluctuation that occurs in the reproduction signal due to a defect or the like on the recording medium is detected, and the gain control is held or the control response speed is changed on the basis of the local fluctuation, whereby the phenomenon that the input signal exceeds the input dynamic range after passing through the defect can be suppressed, and the signal amplitude of the input signal can always be kept approximately constant.

Further, the present invention provides a signal processing method comprising a step of detecting a peak value from a signal read from an information recording medium; a step of detecting a bottom value from the signal read from the information recording medium; a step of calculating an offset on the basis of the peak value and the bottom value to output an offset information signal; a step of detecting a dropout from the signal read from the information recording medium; and a step of controlling the offset of the input signal on the basis of the offset information signal; wherein, during the dropout detection, the offset control for the input signal is held or the control speed is lowered. In the above-described method, a local fluctuation that occurs in the reproduction signal due to a defect or the like on the recording medium is detected, and the offset control is held or the control response speed is changed on the basis of the local fluctuation, whereby the phenomenon that the input signal exceeds the input dynamic range after passing through the defect can be suppressed, and the offset of the input signal can always be kept approximately constant.

BRIEF DESCRIPTION OF THE DRAWINGS

FIGS. 4(a) and 4(b) are block diagrams illustrating a signal processing apparatus according to a second embodiment of the invention, wherein FIG. 4(a) shows the entire construction of the apparatus, and FIG. 4(b) shows the internal construction of a gain controller or an offset controller.

FIGS. 10(a)–10(e) are diagrams illustrating the manner of generating a gate signal, wherein FIG. 10(a) shows a second reproduction signal, FIG. 10(b) shows the reproduction signal which has passed through an LPF, FIG. 10(c) shows a first binarized signal, FIG. 10(d) shows a second binarized signal, and FIG. 10(e) shows a gate signal.

FIGS. 11(a)–11(c) are diagrams illustrating the manner of gain/offset control, wherein FIG. 11(a) shows a first reproduction signal, FIG. 11(b) shows an input waveform to an A/D converter, and FIG. 11(c) shows a gate signal.

FIGS. 19(a) and 19(b) are diagrams for explaining an optical disc device including a signal processing apparatus according to a tenth embodiment of the invention, wherein FIG. 19(a) shows the entire construction of the apparatus, and FIG. 19(b) is a flowchart for explaining its learning control operation.

FIG. 21 is a diagram illustrating a reproduction waveform in the case where a reproduction signal has a DC offset.

FIG. 23 is a diagram for explaining problems in the case where a signal dropout exists in an input reproduction signal.

FIG. 24 is a diagram for explaining an operation for solving the problem that a signal dropout exists in an input reproduction signal.

BEST MODE TO EXECUTE THE INVENTION

Embodiment 1

In a first embodiment of the present invention a dropout is detected from sampling data outputted from an A/D converter, and at least one of gain control and offset control is held or its control speed is changed, thereby to suppress a phenomenon in which a reproduction signal that has passed through a signal dropout portion exceeds an input dynamic range of the A/D converter and, simultaneously, improve precision of dropout detection.

Hereinafter, the first embodiment of the present invention will be described in detail with reference to the drawings.

Figure 1:
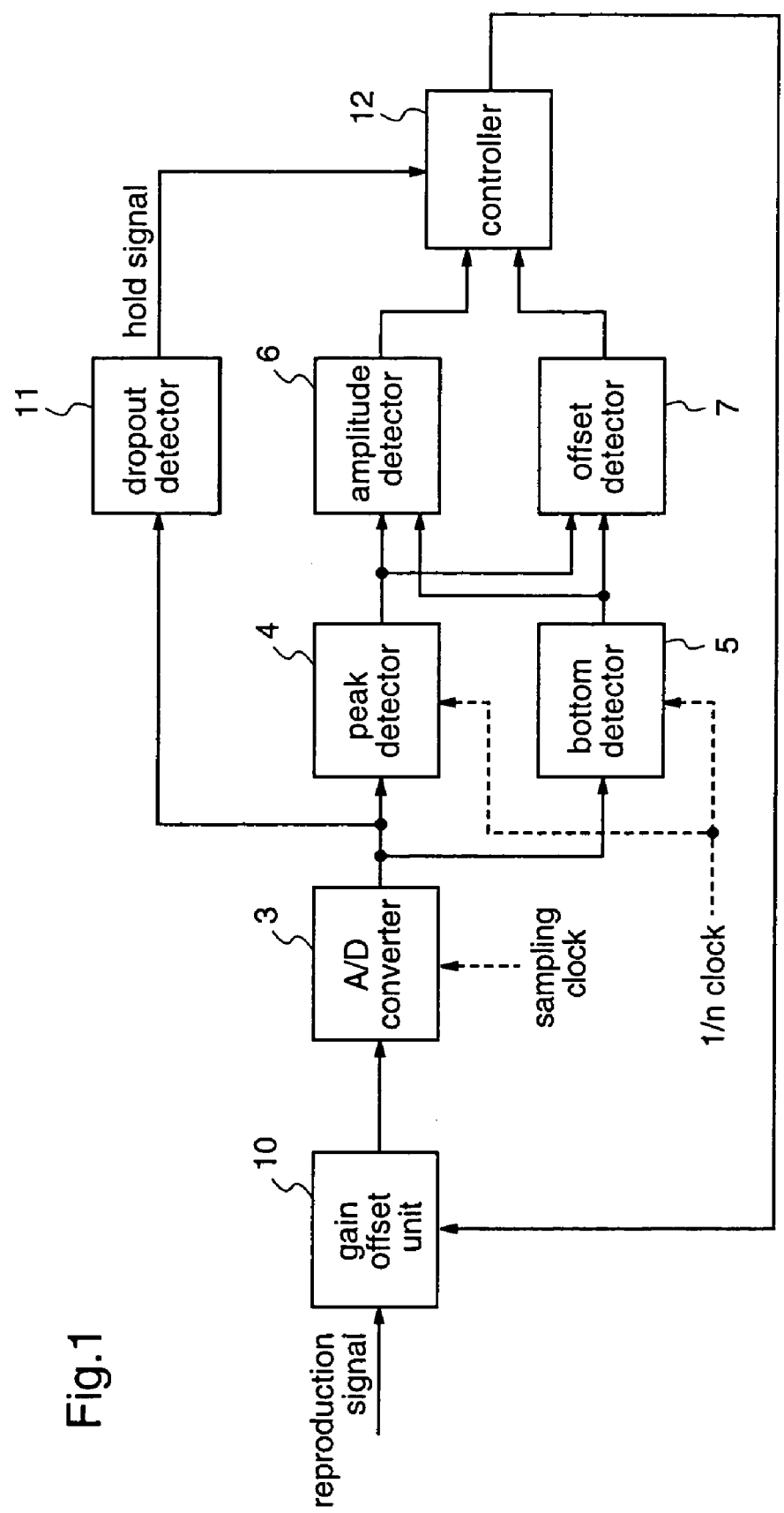
FIG. 1 is a block diagram illustrating a signal processing apparatus according to a first embodiment of the invention.

FIG. 1 is a block diagram illustrating a signal processing apparatus according to the first embodiment.

The signal processing apparatus comprises a gain offset unit 10 which gives a gain based on an inputted control signal and a DC offset based on an inputted offset control signal, to an input reproduction signal; an A/D converter 3 which receives the output of the gain offset unit 10, and subjects the signal to sampling with a clock of a predetermined clock cycle T, and analog-to-digital conversion, thereby to output sampling data; a peak detector 4 which receives the output of the A/D converter 3, and subjects the signal to peak detection with a clock having a cycle n times (n: positive integer) as long as the clock cycle T; a bottom detector 5 which receives the output of the A/D converter 3, and subjects the signal to bottom detection with a clock having a cycle n times (n: positive integer) as long as the clock cycle T; an amplitude detector 6 which receives the outputs of the peak detector 4 and the bottom detector 5, and calculates a signal amplitude at the input of the A/D converter 3 to output an amplitude information signal; an offset detector 7 which receives the outputs of the peak detector 4 and the bottom detector 5, and calculates a signal offset at the input of the A/D converter 3 to output an offset information signal; a dropout detector 11 which receives the output of the A/D converter 3, and detects a dropout of the input signal to output a hold signal; and a controller 12 which performs gain control and offset control for the gain offset unit 10 on the basis of the amplitude information signal and the offset information signal, and is able to hold the control operation or changes the control speed on the basis of the inputted hold signal.

Figure 2:
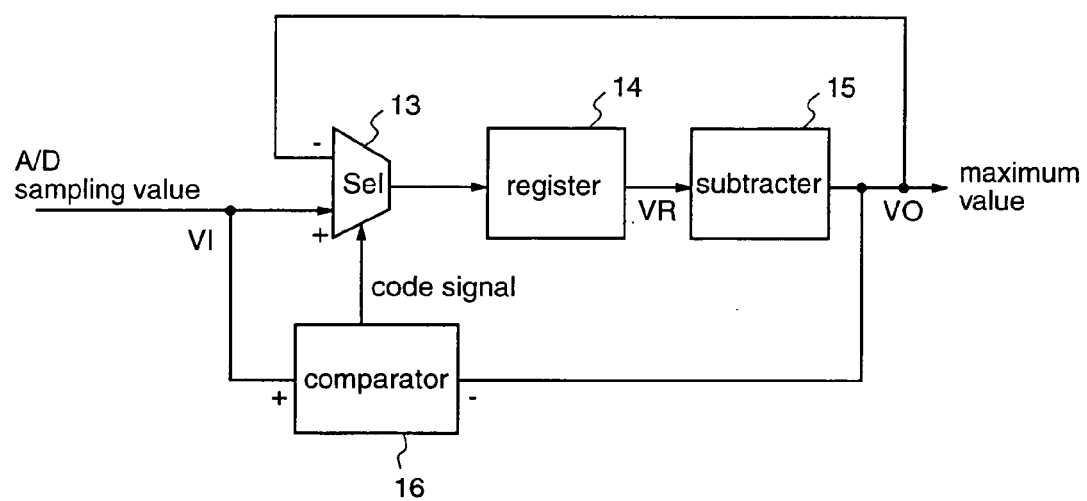
FIG. 2 is a block diagram illustrating an example of a peak detector.

Next, the operation of the first embodiment will be described. The reproduction signal from the information recording medium is given a gain and an offset based on inputted control signals by the gain offset unit 10, and thereafter, it is sampled with a clock having a predetermined clock cycle T and then converted into a quantified digital signal by the A/D converter 3. Then, the digital signal is subjected to peak detection and bottom detection by the peak detector 4 and the bottom detector 5, respectively. The peak detector 4 is composed of a selector 13, a register 14 for temporarily holding the peak value, a subtracter 15, and a comparator 16, as shown in FIG. 2. The comparator 16 compares the present sampling value with the sampling value that is by one sample previous to the present sampling value, which previous value is stored in the register 14. When the present sampling value is larger than the previous sampling value, the present sampling value is stored in the register 14. Otherwise, the register 14 is not rewritten. A peak of the digital signal is detected by continuously performing this operation. However, the peak detector 4 merely detects a maximum value, and it cannot follow a fluctuation of the amplitude of the reproduction signal in the amplitude reducing direction. So, the subtracter 15 subtracts a predetermined value from the value stored in the register 14 at regular clock intervals, and the value of the register 14 is replaced with the output of the subtracter 15 when the present sampling value is smaller than the output from the subtracter 15.

Figure 3:
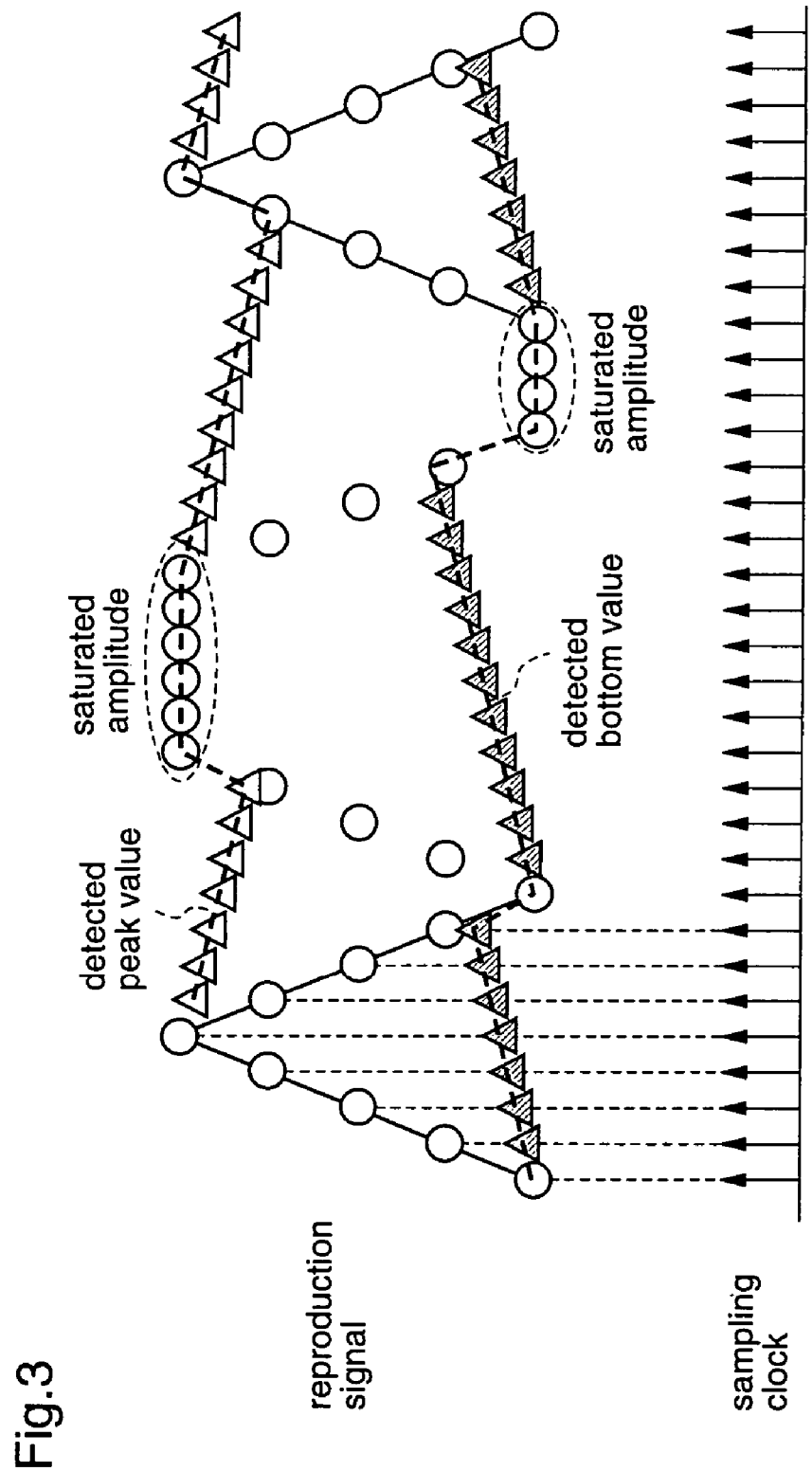
FIG. 3 is a block diagram illustrating the operation of the peak detector.

This operation will be specifically described with reference to FIG. 3. In FIG. 3, O indicates the sampling values employed by the A/D converter 3, and Δ indicates the manner of subtracting a predetermined value at every one clock after peak detection. It is desired that the amount of subtraction should be set to an extent that can follow the signal drop rate of the reproduction signal when passing through the dropout portion. Further, while in this first embodiment both of peak detection and bottom detection are carried out with the A/D clock as that used by the A/D converter 3, the clock to be used for peak detection and bottom detection is not restricted thereto. To be specific, since EFM and 8–16 modulation are employed as modulation methods for CD (Compact Disc) and DVD (Digital VerAtile Disc), respectively, mark lengths are distributed within a range from 3 T to 11 T or 14 T (T: one cycle of clock), and the amplitude of the reproduction signal almost reaches the Aturated amplitude at a mark longer than 5 T. Therefore, both of peak detection and bottom detection can be carried out with nT cycle (n: positive integer) as shown in FIG. 1, or peak detection and bottom detection can be carried out with mT cycle and nT cycle (m, n: mutually independent positive integers), respectively, without problems in practical use. Thus, power consumption can be reduced by performing peak detection and bottom detection with frequency-divided clocks.

Further, the operation of the bottom detector 5 is realized by reversing the polarity of the operation of the peak detector 4.

Next, the amplitude detector 6 and the offset detector 7 perform amplitude detection and offset detection, respectively, on the basis of the detected peak value and the detected bottom value. For example, amplitude detection is carried out by calculating a difference between the peak value and the bottom value, and offset detection is carried out by calculating the sum of the peak value and the bottom value or a difference in distances from the A/D center level, or by detecting whether the peak value and the bottom value are respectively within predetermined window ranges. The controller 12 compares the detected amplitude value with a target amplitude value, and controls the gain offset unit 10 so as to increase the gain of the gain offset unit 10 when the detected amplitude value is smaller than the target value. Conversely, when the detected amplitude value is larger than the target value, the controller 12 controls the gain offset unit 10 so as to reduce the gain of the gain offset unit 10. The controller 12 compares the detected amplitude value with a target amplitude value, and controls the gain offset unit 10 so as to increase the output signal amplitude of the gain offset unit 10 when the detected amplitude value is smaller than the target value. Conversely, when the detected amplitude value is larger than the target value, the controller 12 controls the gain offset unit 10 so as to reduce the output signal amplitude of the gain offset unit 10. Further, the controller 12 compares the detected offset value with a target offset value, and controls the gain offset unit 10 so as to increase the output signal offset of the gain offset unit 10 when the detected offset value is smaller than the target value. On the other hand, when the detected offset value is larger than the target value, the controller 12 controls the gain offset unit 10 so as to reduce the output signal offset of the gain offset unit 10. The dropout detector 11 detects a dropout of the reproduction signal by binarizing the output signal from the peak detector 4 with a predetermined threshold, and outputs a dropout detection signal. Using the dropout detection signal from the dropout detector 11, the control operation of the controller 12 is compulsorily held or the control response speed is lowered, whereby excessive response as shown in FIG. 23(b) is suppressed to obtain a waveform as shown in FIG. 24(b).

In this way, a local fluctuation in the reproduction signal caused by a defect on the recording medium or the like is detected, and the gain control and offset control are held or the control response speed is changed, thereby suppressing the phenomenon in which the reproduction signal that has passed through the defect portion exceeds the input dynamic range of the A/D converter 3. Accordingly, the signal amplitude and offset at the input of the A/D converter 3 can always be kept approximately constant, thereby avoiding the problem that data reproduction cannot be normally carried out because of a wasted time from when the reproduction signal has passed through the signal dropout portion to when the reproduction signal goes into the input dynamic range of the A/D converter 3 and is pulled into the normal state, resulting in an effect that data errors after passing through the data dropout portion can be minimized. Further, because the dropout detection signal can be correctly detected as shown in FIG. 24(c) without being interrupted during the dropout period as shown in FIG. 23(c), it is effective in a system which performs dropout detection after A/D conversion.

While in this first embodiment holding of the controller or changing of the control response speed is carried out on the basis of the output of the dropout detector 11, it may be carried out on the basis of a signal generated by, for example, detecting a dropout outside the signal processing apparatus. Alternatively, it may be carried out on the basis of a signal supplied from the outside not when a dropout is detected but when holding of the control operation is desired.

Further, while in this first embodiment the dropout detector 11 receives the output of the A/D converter 3, it may receive at least one of the output of the A/D converter 3, the output of the bottom detector 5, the output of the offset detector 7, and the amplitude information signal.

Figure 17:
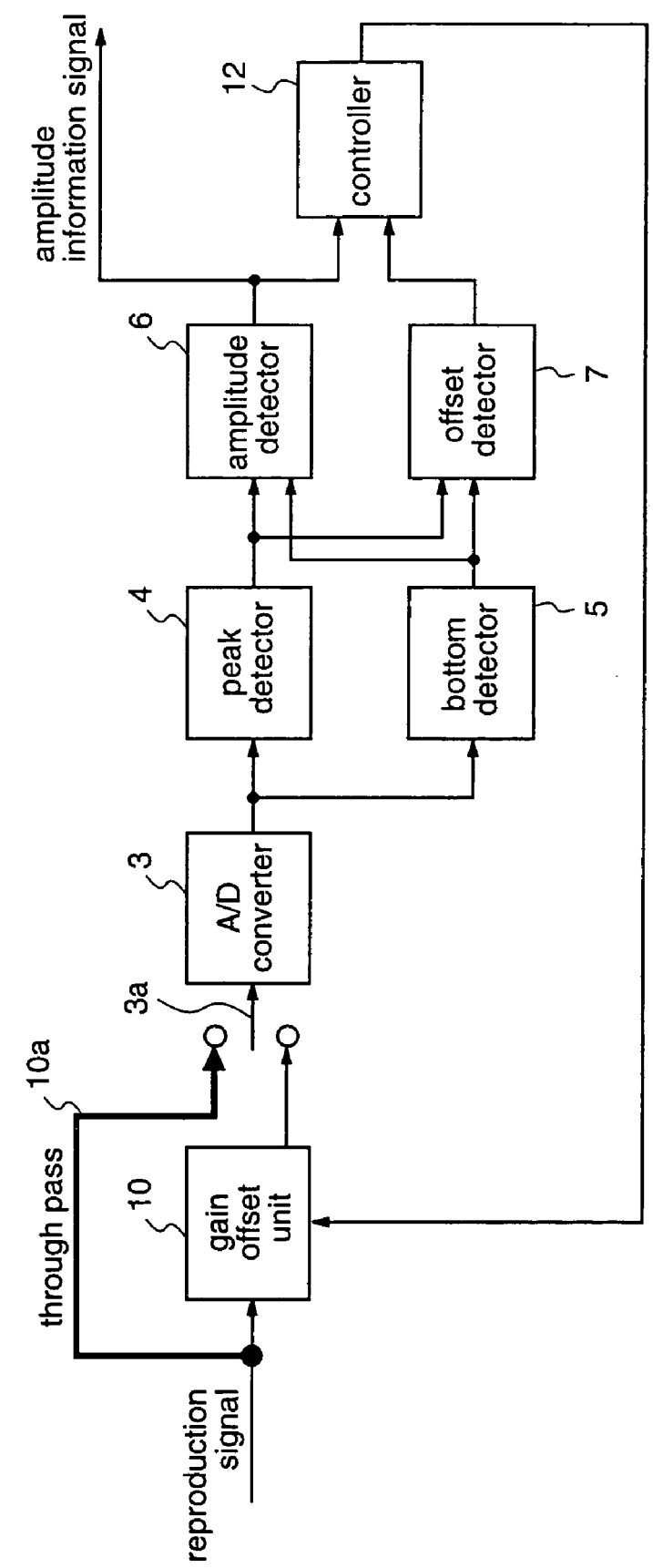
FIG. 17 is a block diagram illustrating a modification of the signal processing apparatus according to the first embodiment, which has a path that bypasses a variable gain amplifier.

Furthermore, as shown in FIG. 17, a through path 10a, i.e., a path which bypasses the gain offset unit 10, may be provided, and the amplitude information signal may be transmitted through this path 10a to be input to the A/D converter 3 via a switch 3a, whereby absolute value information of the signal amplitude of the input reproduction signal can be obtained. There are many cases where optical disc players and the like employ absolute value information of signal amplitude of a reproduction signal to determine the disc type and, in these cases, measurement of signal amplitude without passing the signal through the gain offset unit is realized.

Embodiment 2

A second embodiment includes specific constructions of the gain offset unit and the controller according to the first embodiment.

Hereinafter, the second embodiment of the invention will be described in detail with reference to the drawings. FIG. 4 is a block diagram illustrating a signal processing apparatus according to the second embodiment.

Figure 4A:
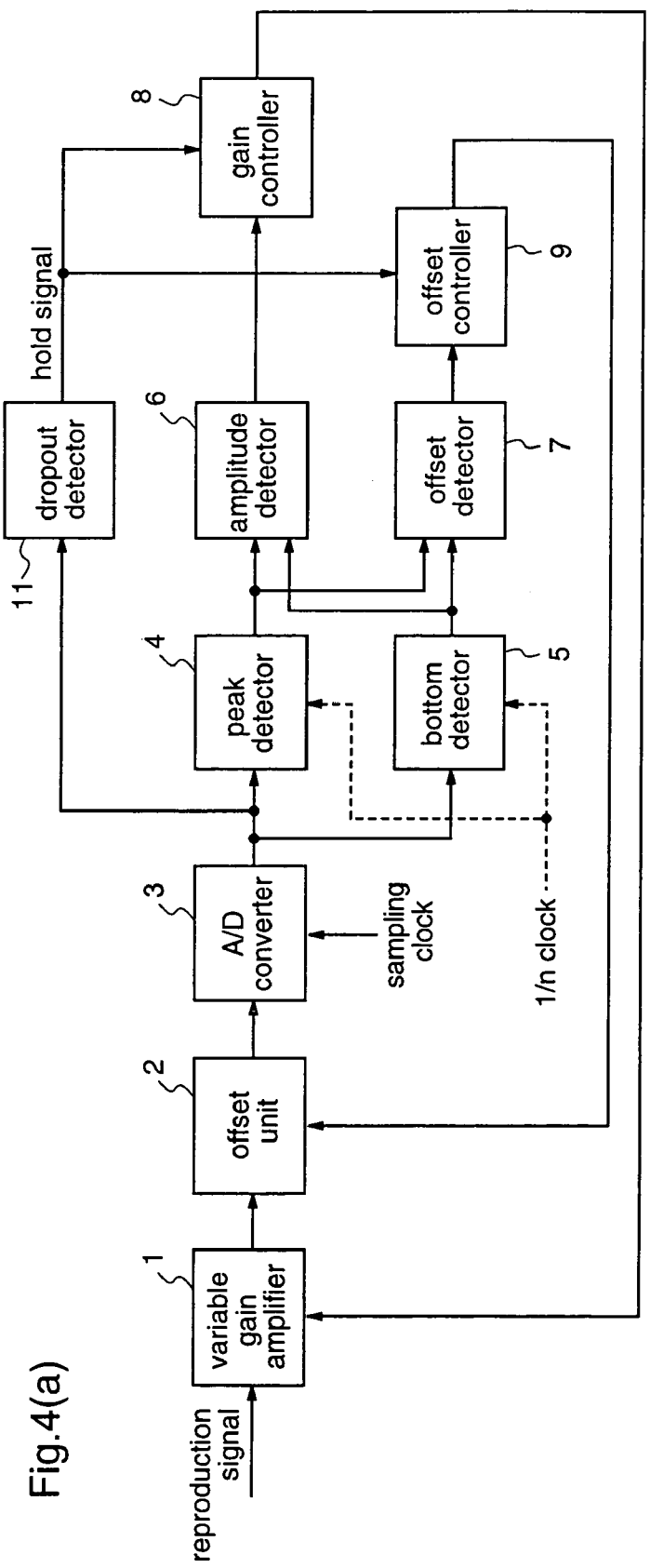

As shown in FIG. 4(a), the signal processing apparatus comprises a variable gain amplifier 1 which gives a gain based on an inputted gain control signal to an inputted reproduction signal; an offset unit 2 which receives the output of the variable gain amplifier 1, and gives a DC offset based on an inputted offset control signal; an A/D converter 3 which receives the output of the offset unit 2, and subjects the signal to sampling with a clock having a predetermined clock cycle T, and A/D conversion, thereby to output sampling data; a peak detector 4 which receives the output of the A/D converter 3, and performs peak detection with a clock having a cycle n times (n: positive integer) as long as the clock cycle T; a bottom detector 5 which receives the output of the A/D converter 3, and performs bottom detection with a clock having a cycle n times (n: positive integer) as long as the clock cycle T; an amplitude detector 6 which receives the outputs of the peak detector 4 and the bottom detector 5, and calculates a signal amplitude of the input to the A/D converter 3 to output an amplitude information signal; an offset detector 7 which receives the outputs of the peak detector 4 and the bottom detector 5, and calculates a signal offset of the input to the A/D converter 3 to output an offset information signal; a dropout detector 11 which receives the output of the peak detector 4, and detects a dropout of this input signal to output a hold signal; a gain controller 8 which controls the variable gain amplifier 1 on the basis of a result of comparison between the amplitude information signal and a target amplitude value, and is able to hold the gain control operation or change the control speed on the basis of the inputted hold signal; and an offset controller 9 which controls the offset unit 2 on the basis of a result of comparison between the offset information signal and a target offset value, and is able to hold the offset control operation or change the control speed on the basis of the externally inputted hold signal.

The variable gain amplifier 1 and the offset unit 2 correspond to the gain offset unit 10 of the first embodiment, and the gain controller 8 and the offset controller 9 correspond to the controller 12 of the first embodiment.

Figure 4B:
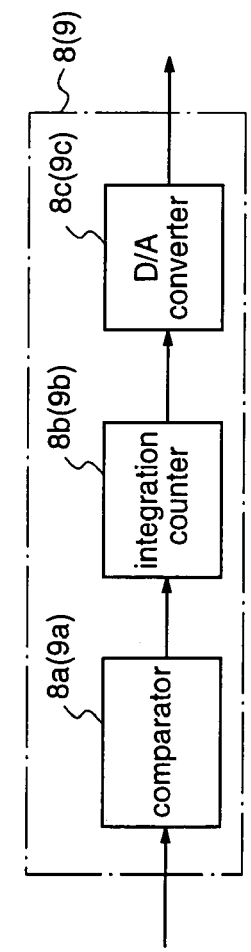

As shown in FIG. 4(b), the gain controller 8 may be composed of a comparator 8a which compares an input signal with a predetermined target value; an integration counter 8b which is up/down changeable according to the polarity of the output from the comparator 8a; and a D/A converter 8c which receives the output of the integration counter 8b, and performs D/A conversion. The D/A converter 8c outputs a control signal for controlling the gain of the variable gain amplifier 1. The offset controller 9 is constituted like the gain controller 8, and outputs a control signal for controlling the amount of offset to the offset unit 2.

Next, the operation of the signal processing apparatus according to the second embodiment will be described. The variable gain amplifier 1 gives a gain based on the gain control signal to the reproduction signal from the information recording medium, and the offset unit 2 gives an offset based on the offset control signal to the reproduction signal. Thereafter, the A/D converter 3 samples the reproduction signal with a clock having a predetermined clock cycle T to convert the signal into a quantified digital signal. The peak detector 4 and the bottom detector 5 perform peak detection and bottom detection from the digital signal, respectively. The peak detection and bottom detection are identical to those described for the first embodiment, and both of them may be carried out with a clock having the same cycle as the predetermined clock cycle T. Alternatively, the peak detection and bottom detection may be performed with a clock having a cycle n times (n: positive integer) as long as the clock cycle T as shown in FIG. 4, or with clocks having cycles which are m times and n times (m,n: mutually independent positive integers) as long as the cycle T, respectively, thereby to reduce power consumption.

Next, the amplitude detector 6 performs amplitude detection and the offset detector 7 performs offset detection, on the basis of the detected peak value and bottom value. For example, amplitude detection is carried out by calculating a difference between the peak value and the bottom value, and offset detection is carried out by calculating the sum of the peak value and the bottom value or a difference in distances from the A/D center level, or by detecting whether or not the peak value and the bottom value are respectively within predetermined window ranges. The gain controller 8 compares the detected amplitude value with a target amplitude value, and controls the variable gain amplifier 1 so as to increase the gain of the amplifier 1 when the detected value is smaller than the target value. Conversely, when the detected amplitude value is larger than the target value, the gain controller 8 controls the variable gain amplifier so as to reduce the gain of the variable gain amplifier 1. The gain controller 8 compares the detected amplitude value with a target amplitude value, and controls the variable gain amplifier 1 so as to increase the output signal amplitude of the amplifier 1 when the detected amplitude value is smaller than the target value. Conversely, when the detected amplitude value is larger than the target value, the gain controller 8 controls the variable gain amplifier 1 so as to reduce the output signal amplitude of the amplifier 1. Furthermore, the offset controller 9 compares the detected offset value with a target offset value, and controls the offset unit 2 50 as to increase the output signal offset of the offset unit 2 when the detected offset value is smaller than the target value. Conversely, when the detected offset value is larger than the target value, the offset controller 9 controls the offset unit 2 so as to reduce the output signal offset. The dropout detector 11 binarizes the output of the peak detector 4 with a predetermined threshold value to detect a dropout of the reproduction signal, and compulsorily holds the operation of the controller 12 or decreases the control response speed using this signal, whereby excessive response as shown in FIG. 23(b) is suppressed to obtain a waveform as shown in FIG. 24(b).

In this way, a local fluctuation in the reproduction signal, which is caused by a defect in the recording medium or the like, is detected, and the gain control or offset control is held or the control response speed is changed on the basis of the fluctuation, thereby suppressing the phenomenon in which the reproduction signal that has passed through the defect portion exceeds the input dynamic range of the A/D converter 3. Accordingly, the signal amplitude and offset at the input of the A/D converter 3 can always be kept constant, thereby avoiding the problem that data reproduction cannot be normally carried out because of a wasted time from when the reproduction signal has passed through the signal dropout portion to when the signal enters in the input dynamic range of the A/D converter 3 and is pulled into the normal state, resulting in an effect that data error after passing through the defect portion can be minimized. Further, since the dropout detection signal can be correctly detected as shown in FIG. 24(c) without being interrupted during the dropout period as shown in FIG. 23(c), this second embodiment is effective particularly when the signal processing apparatus employs a construction that detects a dropout after A/D conversion.

While in this second embodiment holding of the gain controller 8 or changing of the control response speed is carried out on the basis of the output signal from the dropout detector 11, it may be carried out on the basis of a signal that is generated by detecting a dropout outside the signal processing apparatus. Alternatively, it may be carried out on the basis of a signal that is supplied from the outside not when a dropout is detected but when holding of the control operation is desired.

Further, while in this second embodiment the dropout detector 11 receives the output of the peak detector 4, it may receive at least one of the output of the peak detector 4, the output of the A/D converter 3, the output of the bottom detector 5, the output of the offset detector 7, and the amplitude information signal.

Figure 18:
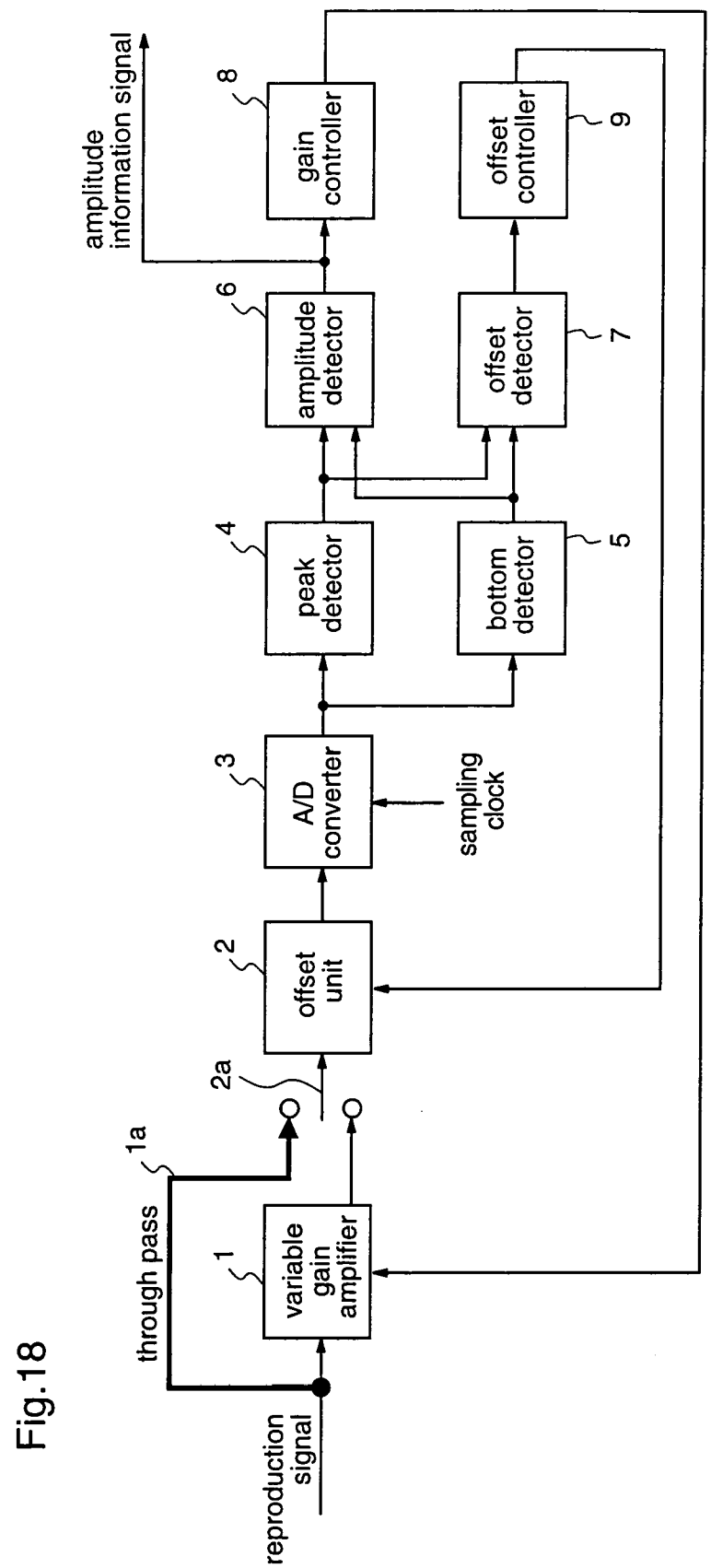
FIG. 18 is a block diagram illustrating another modification of the signal processing apparatus according to the first embodiment, which has a path that bypasses a variable gain amplifier.

Furthermore, as shown in FIG. 18, there may be provided a through path 1a, i.e., a path which bypasses the variable gain amplifier 1, and the amplitude information signal may be transmitted through this path to be inputted to the A/D converter 3 via a switch 2a, whereby absolute value information of the signal amplitude of the inputted reproduction signal can be obtained. There are many cases where optical disc players and the like employ absolute value information of signal amplitude of a reproduction signal to determine the disc type and, in these cases, measurement of signal amplitude without passing the signal through the gain offset unit is realized.

Embodiment 3

In a third embodiment a clock generated from an input reproduction signal is used as a sampling clock.

Figure 5:
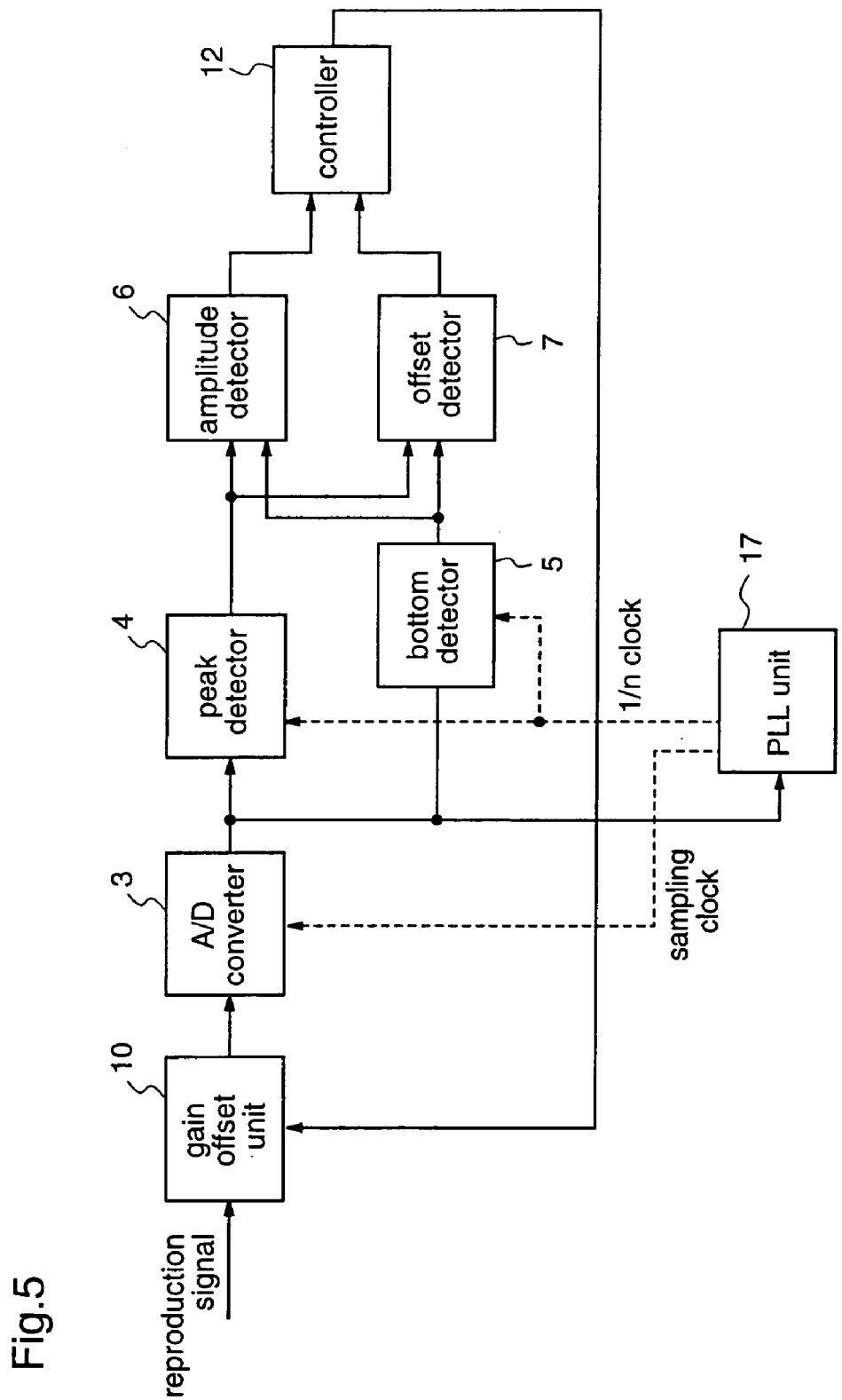
FIG. 5 is a block diagram illustrating a signal processing apparatus according to a third embodiment of the invention.

Hereinafter, the third embodiment of the present invention will be described in detail with reference to the drawings. FIG. 5 is a block diagram illustrating a signal processing apparatus according to the third embodiment.

The signal processing apparatus is provided with a gain offset unit 10 which gives a gain based on an inputted gain control signal and a DC offset based on an inputted offset control signal, to an inputted reproduction signal; an A/D converter 3 which receives the output of the gain offset unit 10, and subjects the signal to sampling with a clock having a predetermined clock cycle T, and A/D conversion, thereby outputting sampling data; a peak detector 4 which receives the output of the A/D converter 3, and performs peak detection using a clock having a cycle n times (n: positive integer) as long as the clock cycle T; a bottom detector 5 which receives the output of the A/D converter 3, and performs bottom detection using a clock having a cycle n times (n: positive integer) as long as the clock cycle T; an amplitude detector 6 which receives the outputs of the peak detector 4 and the bottom detector 5, and calculates a signal amplitude of the input to the A/D converter 3 to output an amplitude information signal; an offset detector 7 which receives the outputs of the peak detector 4 and the bottom detector 5, and calculates a signal offset of the input to the A/D converter 3 to output an offset information signal; a controller 12 which performs gain control and offset control of the gain offset unit 10 on the basis of the amplitude information signal and the offset information signal; and a PLL unit 17 which generates a clock that is phase-locked with the sampling data outputted from the A/D converter 3.

Next, the operation of the third embodiment will be described. The gain offset unit 10 gives a gain and an offset based on the inputted control signals to the reproduction signal from the information recording medium, and the A/D converter 3 samples the reproduction signal with a clock outputted from the PLL unit 17 to convert the signal into a quantified digital signal. The peak detector 4 and the bottom detector 5 perform peak detection and bottom detection from the digital signal, respectively. The peak detection and bottom detection are identical to those described for the first embodiment. That is, both of them may be carried out using a clock having the same cycle as the predetermined clock cycle T. Alternatively, the peak detection and bottom detection may be carried out with a clock having a cycle n times (n: positive integer) as long as the clock cycle T as shown in FIG. 5, or with clocks having cycles which are m times and n times (m,n: mutually independent positive integers) as long as the cycle T, respectively, thereby to reduce power consumption.

Next, the amplitude detector 6 and the offset detector 7 perform amplitude detection and offset detection on the basis of the detected peak value and the detected bottom value, respectively. For example, amplitude detection is carried out by calculating a difference between the peak value and the bottom value, and offset detection is carried out by calculating the sum of the peak value and the bottom value or a difference in distances from the A/D center level, or by detecting whether or not the peak value and the bottom value are respectively within predetermined window ranges. The operation of the controller 12 is identical to that described for the first embodiment, and the controller 12 controls the gain offset unit 10 so that the output amplitude and the offset attain the predetermined target values on the basis of the detected amplitude value and the detected offset value, respectively. The PLL unit 17 extracts a clock component possessed by the reproduction signal, and a clock so generated is used as a sampling clock for the A/D converter 3. The PLL unit 17 extracts phase error information from the sampling data outputted from the A/D converter 3, and drives a voltage-controlled oscillator or the like on the basis of the error information to generate a phase-locked clock.

As described above, since the PLL clock that is phase-locked with the reproduction signal is used as the sampling clock of the A/D converter 3, the sampling speed of the A/D converter 3 automatically changes according to the reproduction speed, and the time constants of peak detection and bottom detection also change adaptively, whereby application to CAV reproduction is facilitated. Further, since the operation clock for the peak detector 4 and the bottom detector 5 is set to 1/n (n: positive integer) of the PLL clock, the operating clock frequency is reduced to reduce power consumption. Therefore, the signal amplitude and offset of the input to the A/D converter 3 can always be kept approximately constant, resulting in stable A/D conversion.

Embodiment 4

In a fourth embodiment an oscillation frequency of a reproduction clock is fixed when detecting a dropout or the like.

Figure 6:
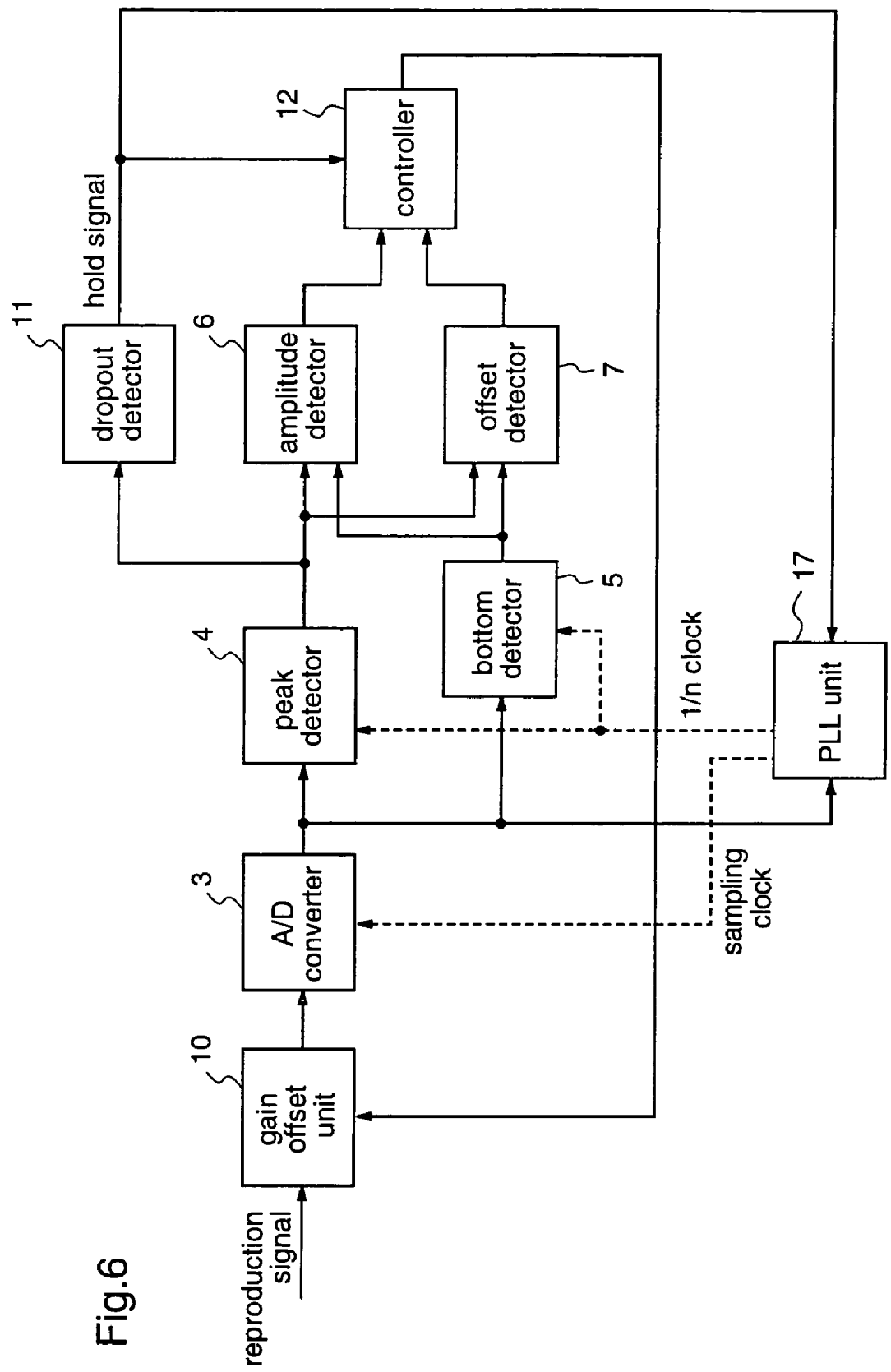
FIG. 6 is a block diagram illustrating a signal processing apparatus according to a fourth embodiment of the present invention.

Hereinafter, the fourth embodiment of the present invention will be described in detail with reference to the drawings. FIG. 6 is a block diagram illustrating a signal processing apparatus according to the fourth embodiment.

The signal processing apparatus comprises a gain offset unit 10 which gives a gain based on an inputted gain control signal and a DC offset based on an inputted offset control signal, to an inputted reproduction signal; an A/D converter 3 which receives the output of the gain offset unit 10, and subjects the signal to sampling with a clock having a predetermined clock cycle T, and A/D conversion, thereby outputting sampling data; a peak detector 4 which receives the output of the A/D converter 3, and performs peak detection with a clock having a cycle n times (n: positive integer) as long as the clock cycle T; a bottom detector 5 which receives the output of the A/D converter 3, and performs bottom detection with a clock having a cycle n times (n: positive integer) as long as the clock cycle T; an amplitude detector 6 which receives the outputs of the peak detector 4 and the bottom detector 5, and calculates a signal amplitude of the input to the A/D converter 3 to output an amplitude information signal; an offset detector 7 which receives the outputs of the peak detector 4 and the bottom detector 5, and calculates a signal offset of the input to the A/D converter 3 to output an offset information signal; a dropout detector 11 which receives the output of the peak detector 4, and detects a dropout of the input signal to output a hold signal; a controller 12 which performs gain control and offset control of the gain offset unit 10 on the basis of the amplitude information signal and the offset information signal; and a PLL unit 17 which generates a clock that is phase-locked with the sampling data outputted from the A/D converter 3.

Next, the operation of the fourth embodiment will be described. The gain offset unit 10 gives a gain and an offset based on the inputted control signals to the reproduction signal from the information recording medium, and then the A/D converter 3 samples the reproduction signal with a clock outputted from the PLL unit 17 to convert the signal into a quantified digital signal. Then, the peak detector 4 and the bottom detector 5 perform peak detection and bottom detection from the digital signal, respectively. The peak detection and bottom detection are identical to those described for the first embodiment, that is, both of them are carried out with a clock having the same cycle as the predetermined clock cycle T. Alternatively, the peak detection and bottom detection may be carried out with a clock having a cycle n times (n: positive integer) as long as the clock cycle T as shown in FIG. 6, or with clocks having cycles which are m times and n times (m,n: mutually independent positive integers) as long as the cycle T, respectively, thereby to reduce power consumption.

Next, the amplitude detector 6 performs amplitude detection, and the offset detector 7 performs offset detection, on the basis of the detected peak value and bottom value. For example, amplitude detection is carried out by calculating a difference between the peak value and the bottom value, and offset detection is carried out by calculating the sum of the peak value and the bottom value or a difference in distances from the A/D center level, or by detecting whether the peak value and the bottom value are within predetermined window ranges or not, respectively. The operation of the controller 12 is identical to that described for the first embodiment, and the controller 12 controls the gain offset unit 10 so that the output amplitude and offset of the gain offset unit 10 attain the predetermined target values, on the basis of the detected amplitude value and offset value. The PLL unit 17 extracts a clock component possessed by the reproduction signal, and a clock so generated is used as a sampling clock of the A/D converter 3. The PLL unit 17 extracts phase error information from the sampling data outputted from the A/D converter 3, and generates a PLL clock by driving a voltage controlled oscillator or the like on the basis of the error information. As already described for the first embodiment, the control operation of the controller 12 is compulsorily held or the control response speed is decreased by the signal obtained in the dropout detector 11, and the sampling clock frequency outputted from the PLL unit 17 is held or the frequency response speed is decreased.

As described above, since the PLL clock which is phase-locked with the reproduction signal is used as the sampling clock for the A/D converter 3, the sampling speed of the A/D converter 3 automatically changes according to the playback speed, whereby application to CAV reproduction is facilitated. Further, since the frequency of the operation clock for the peak detector 4 and the bottom detector 5 is set to 1/n (n: positive integer) of the frequency of the PLL clock, the operation clock frequency is reduced, resulting in a reduction in power consumption.

Furthermore, a local fluctuation in the reproduction signal caused by a defect in the recording medium or the like is detected, and the gain control, offset control, and PLL control are held or the control response speeds are changed on the basis of the local fluctuation, thereby suppressing the phenomenon in which the reproduction signal that is passing or has passed through the defect portion exceeds the input dynamic range of the A/D converter 3. Therefore, the sampling clock can be kept stable, and the signal amplitude and offset at the input of the A/D converter 3 can always be kept approximately constant, thereby avoiding the problem that data reproduction cannot be normally carried out because of a wasted time from when the reproduction signal has passed through the signal dropout portion to when it enters in the input dynamic range of the A/D converter 3 and is pulled into the normal state, resulting in an effect that data error after passing the data dropout portion can be minimized. Further, since the dropout detection signal can be correctly detected as shown in FIG. 24(c) without being interrupted during the dropout period as shown in FIG. 23(c), this fourth embodiment is particularly effective in a system which detects a dropout after A/D conversion.

While in this fourth embodiment holding of the controller 12 or changing of the control response speed is carried out on the basis of the output of the dropout detector 11, it may be carried out on the basis of a signal generated by detecting a dropout outside the signal processing apparatus. Alternatively, it may be carried out on the basis of a signal supplied from the outside not when a dropout is detected but when holding of the control operation is desired.

Further, while in this fourth embodiment the dropout detector 11 receives the output of the peak detector 4, it may receive at least one of the output of the peak detector 4, the output of the A/D converter 3, the output of the bottom detector 5, the output of the offset detector 7, and the amplitude information signal.

Embodiment 5

A fifth embodiment enables data reproduction from different recording areas in the A/D signal processing system.

Figure 7:
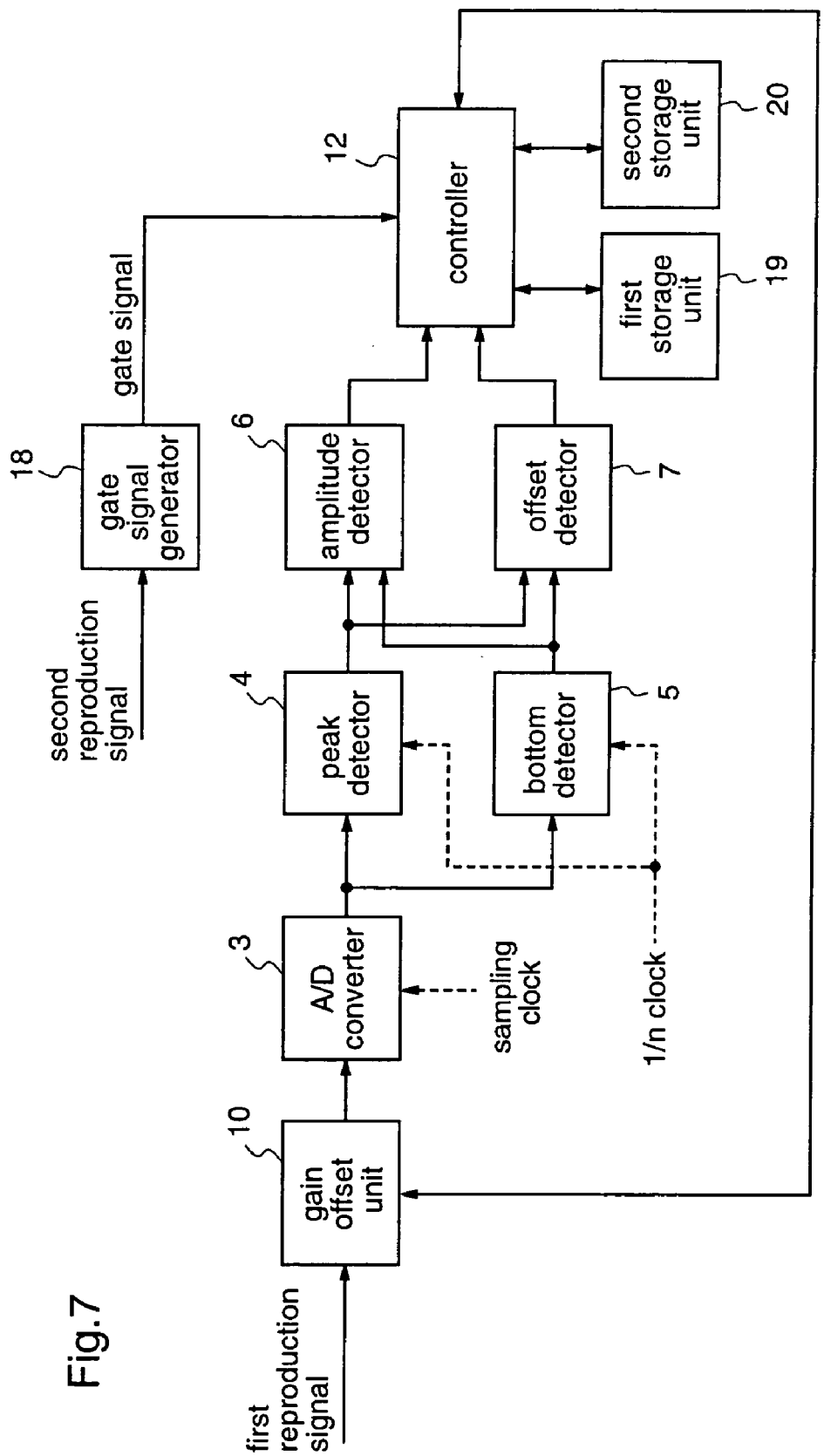
FIG. 7 is a block diagram illustrating a signal processing apparatus according to a fifth embodiment of the present invention.

Hereinafter, the fifth embodiment of the present invention will be described with reference to the drawings. FIG. 7 is a block diagram illustrating a signal processing apparatus according to the fifth embodiment.

The signal processing apparatus comprises a gain offset unit 10 which gives a gain based on an inputted gain control signal and a DC offset based on an inputted offset control signal, to a first reproduction signal; an A/D converter 3 which receives the output of the gain offset unit 10 and a clock, subjects the signal to sampling with a clock having a predetermined clock cycle T, and A/D conversion, thereby to output sampling data; a peak detector 4 which receives the output of the A/D converter 3, and performs peak detection from the signal; a bottom detector 5 which receives the output of the A/D converter 3, and performs bottom detection from the signal; an amplitude detector 6 which receives the outputs of the peak detector 4 and the bottom detector 5, and calculates a signal amplitude of the input to the A/D converter 3 to output an amplitude information signal; an offset detector 7 which receives the outputs of the peak detector 4 and the bottom detector 5, and calculates a signal offset of the input to the A/D converter 3 to output an offset information signal; a gate signal generator 18 which receives a second reproduction signal, and recognizes area information on the optical disc recording medium to generate a gate signal indicating present area information; a controller 12 which performs gain control and offset control of the gain offset unit 10 on the basis of the amplitude information signal and the offset information signal, and is able to independently control the gain and the offset on the basis of the gate signal; and a first storage unit 19 and a second storage unit 20 in which the gain and offset control values outputted from the controller 12 are stored.

Next, the operation of the signal processing apparatus according to the fifth embodiment will be described. The gain offset unit 10 gives a gain and an offset based on the inputted control signals to the first reproduction signal from the information recording medium, and thereafter, the A/D converter 3 samples the first reproduction signal with a clock having a predetermined clock cycle T to convert the signal into a quantified digital signal. Then, the peak detector 4 and the bottom detector 5 perform peak detection and bottom detection from the digital signal, respectively. The peak detection and bottom detection are identical to those of the first embodiment, that is, both of them may be carried out with a clock having the same cycle as the predetermined clock cycle T. However, as shown in FIG. 7, both of peak detection and bottom detection may be performed with a clock having a cycle n times (n: positive integer) as long as the cycle T, or peak detection and bottom detection may be respectively performed with clocks having cycles which are m times and n times (m,n: mutually independent positive integers) as long as the cycle T, thereby to reduce power consumption.

Next, amplitude detection is carried out by the amplitude detector 6 and offset detection is carried out by the offset detector 7, on the basis of the detected peak value and bottom value. For example, amplitude detection is carried out by calculating a difference between the peak value and the bottom value, and offset detection is carried out by calculating the sum of the peak value and the bottom value or a difference in distances from the A/D center level, or by detecting whether the peak value and the bottom value are respectively within predetermined window ranges or not. The operation of the controller 12 is identical to that described for the first embodiment, and the controller 12 controls the gain offset unit 10 so that the output amplitude and offset of the gain offset unit 10 attain the predetermined target values, on the basis of the detected amplitude value and offset value. The second reproduction signal is input to the gate signal generator 18 to recognize the area information of the optical disc medium. Hereinafter, the operation of the gate signal generator will be described taking a DVD-RAM as an example.

Figure 8:
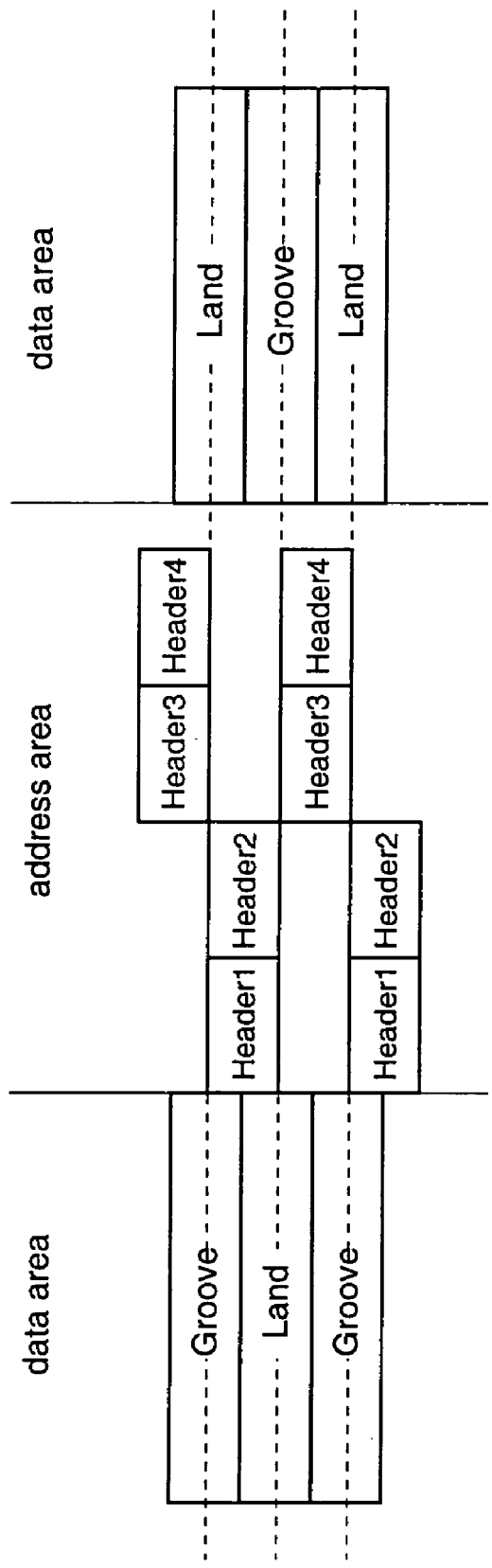
FIG. 8 is a diagram illustrating a physical format of a DVD-RAM.
Figure 9:
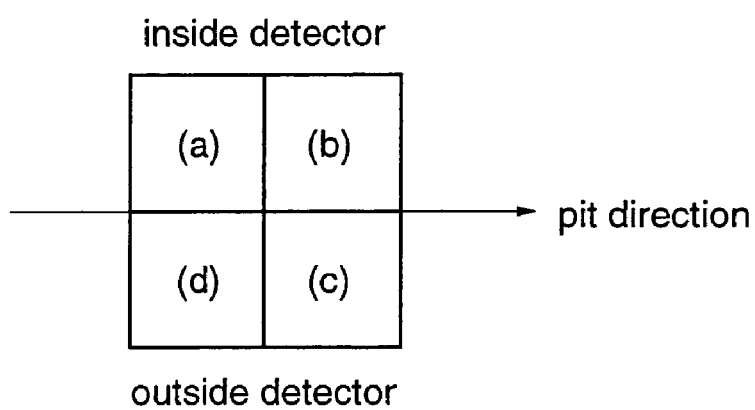
FIG. 9 is a diagram illustrating a photodetector.

FIG. 8 shows a physical format of a DVD-RAM. This physical format is composed of an address area formed of pre-pits, and a rewritable data area. The data area is composed of a land section put between two groove sections, and the address area has headers 1 to 4 each by two. Each pre-pit is formed in a position that is offset from the center of track. When a light beam is received by a four-part optical detector 20 as shown in FIG. 9, a difference signal between a signal (a)+(b) obtained from the inside detectors and a signal (c)+(d) obtained from the outside detectors is obtained as shown in FIG. 10(a). This difference signal is the second reproduction signal, and it is passed through a low-pass filter to obtain a signal as shown in FIG. 10(b). When the signal shown in FIG. 10(b) is binarized with predetermined two binarization levels, signals shown in FIGS. 10(c) and 10(d) are obtained. When these signals are logically added ((c)+(d)), a gate signal indicating an address position is obtained as shown in FIG. 10(e). While the controller 12 performs gain/offset control in the address area, when the reproduction signal shifts from the address area to the data area, i.e., when the gate signal shown in FIG. 10(e) changes from "H" to "L", the gain/offset control values are temporarily stored in the first storage unit 19, and the values stored in the second storage unit 20 are given as gain and offset control values to perform gain and offset control. Therefore, even when the first reproduction signal that is the sum of the signal (a)+(b) obtained from the inside detectors and the signal (c)+(d) obtained from the outside detectors is as shown in FIG. 11(a), the address area and the data area are independently gain/offset controlled, resulting in a signal as shown in FIG. 11(b) at the input of the A/D converter 3.

As described above, according to the fifth embodiment of the invention, different recording areas are detected to generate a gate signal, and gain control and offset control are carried out independently for each recording area, thereby to absorb a difference in signal amplitudes and a difference in offsets between the recording areas. As a result, the signal amplitude and offset at the input of the A/D converter can always be kept constant, and the different recording areas can be reproduced using a single signal processing system.

While in this fifth embodiment a gate signal generated by the gate generator 18 is employed, a signal detected outside the signal processing apparatus may be employed. Further, it may be a signal supplied from the outside not when the area information of the second reproduction signal is recognized but when switching between gain control and offset control is desired.

Embodiment 6

A sixth embodiment includes specific constructions of the gain offset unit and the controller according to the fifth embodiment.

Figure 12:
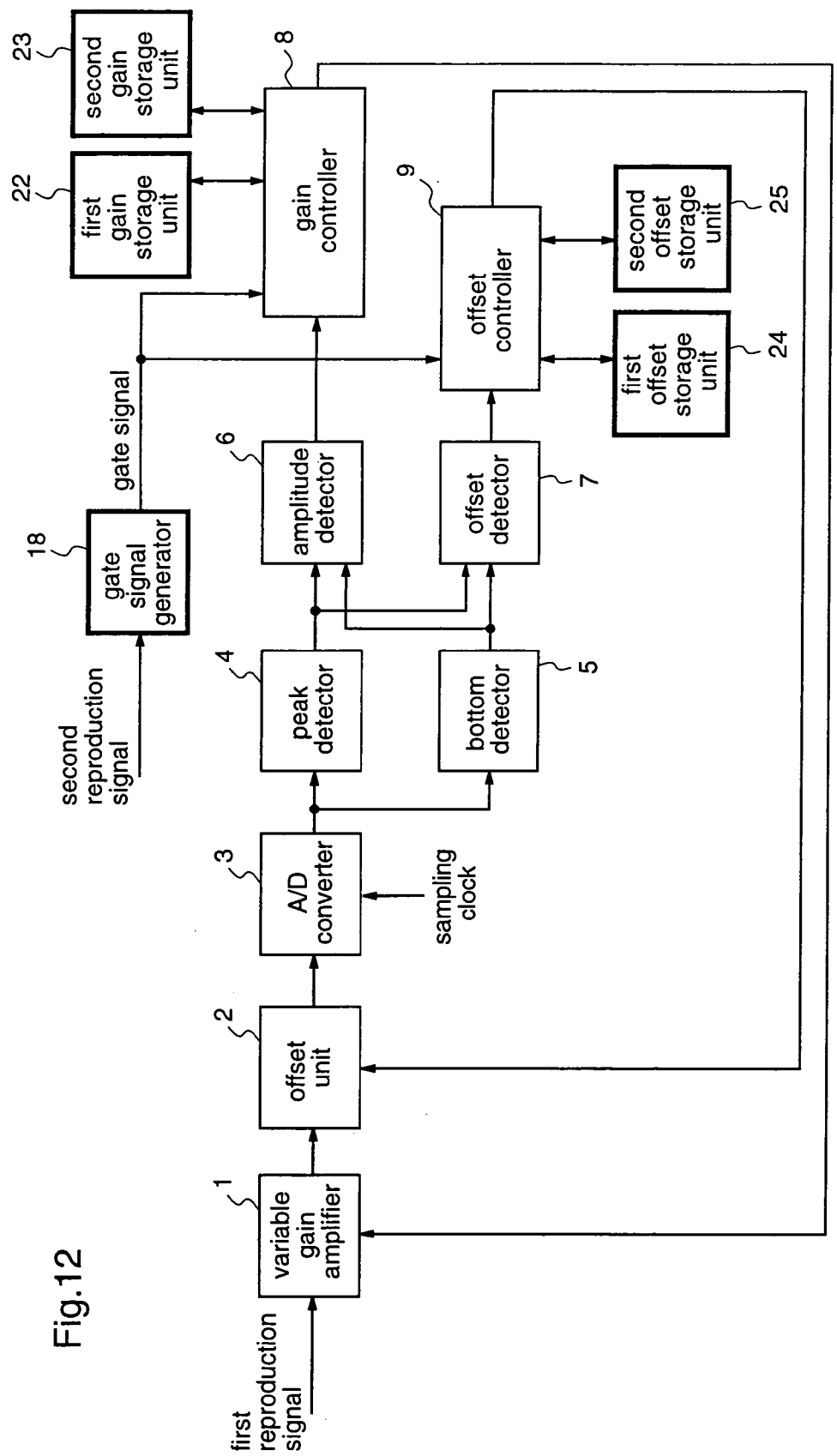
FIG. 12 is a block diagram illustrating a signal processing apparatus according a sixth embodiment of the invention.

Hereinafter, the sixth embodiment of the invention will be described in detail with reference to the drawings. FIG. 12 is a block diagram illustrating a signal processing apparatus according to the sixth embodiment.

This signal processing apparatus comprises a variable gain amplifier 1 which gives a gain based on an inputted gain control signal to an inputted first reproduction signal; an offset unit 2 which receives the output of the variable gain amplifier 1, and gives a DC offset based on an inputted offset control signal to the signal; an A/D converter 3 which receives the output of the offset unit 2 and a clock, and subjects the signal to sampling with the clock having a predetermined clock cycle T, and analog-to-digital conversion, thereby to output sampling data; a peak detector 4 which receives the output of the A/D converter 3, and performs peak detection with a clock having a cycle n times (n: positive integer) as long as the clock cycle T; a bottom detector which receives the output of the A/D converter 3, and performs bottom detection with a clock having a cycle n times (n: positive integer) as long as the clock cycle T; an amplitude detector 6 which receives the outputs of the peak detector 4 and the bottom detector 5, and calculates a signal amplitude of the input to the A/D converter 3 to output an amplitude information signal; an offset detector 7 which receives the outputs of the peak detector 4 and the bottom detector 5, and calculates a signal offset of the input to the A/D converter 3 to output an offset information signal; a gate signal generator 18 which receives a second reproduction signal, and recognizes area information of the optical disc recording medium to generate a gate signal indicating present area information; a gain controller 8 which controls the variable gain amplifier 1 on the basis of a result of comparison between the amplitude information signal and a target amplitude value, and is able to perform independent gain control for each recording area on the basis of the gate signal; a first gain storage unit 22 and a second gain storage unit 23 in which gain control values outputted from the gain controller 8 are stored; an offset controller 9 which controls the offset unit 2 in accordance with a result of comparison between the offset information signal and a target offset value, and is able to perform independent offset control for each recording area on the basis of the gate signal; and a first offset storage unit 24 and a second offset storage unit 25 in which offset control values outputted from the offset controller 9 are stored.

The variable gain amplifier 1 and the offset unit 2 correspond to the gain offset unit 10 of the fifth embodiment, and the gain controller 8 and the offset controller 9 correspond to the controller 12 of the first embodiment.

Next, the operation of the signal processing apparatus according to the sixth embodiment will be described. The variable gain amplifier 1 gives a gain based on the inputted gain control signal to the first reproduction signal, and further, the offset unit 2 gives an offset based on the inputted offset control signal to the first reproduction signal. Thereafter, the A/D converter 3 samples the reproduction signal with a clock having a predetermined clock cycle T to convert it into a quantified digital signal. Then, the peak detector 4 and the bottom detector 5 perform peak detection and bottom detection from the digital signal, respectively. The peak detection and bottom detection are identical to those described for the first embodiment, and both of them may be carried out with a clock having the same cycle as the predetermined clock cycle T. However, as shown in FIG. 12, both of peak detection and bottom detection may be carried out with a clock having a cycle n times (n: positive integer) as long as the clock cycle T, or peak detection and bottom detection may be respectively carried out with clocks having cycles that are m times and n times (m,n: mutually independent positive integers) as long as the clock cycle T, thereby to reduce power consumption.

The gain and offset control operations of the gain controller 8 and the offset controller 9 are identical to those described for the first embodiment. The second reproduction signal is input to the gate signal generator 18, and the gate signal generator 18 recognizes area information on the optical disc medium. While the gain controller 8 performs gain control on the address area, when the reproduction signal shifts from the address area to the data area, it stores the gain control value temporarily in the first gain storage unit 22, and gives a value stored in the second gain storage unit 23 as a gain control value to perform gain control.

Therefore, even when the first reproduction signal is as shown in FIG. 11(a), the address area and the data area are independently subjected to gain control and offset control, resulting in a signal as shown in FIG. 11(b).

As described above, according to the sixth embodiment of the invention, different reading areas are detected to generate a gate signal, and gain control and offset control are carried out independently for each recording area, thereby to absorb a difference in signal amplitudes and a difference in offsets between the recording areas. As a result, the signal amplitude and offset at the input of the A/D converter can always be kept constant.

While in this sixth embodiment a gate signal generated by the gate generator 18 is employed, a signal detected outside the signal processing apparatus may be employed. Further, it may be a signal supplied from the outside not when the area information of the second reproduction signal is recognized but when switching between gain control and offset control is desired.

Furthermore, while in this sixth embodiment gain control and offset control are carried out independently for each area, only gain control or offset control may be carried out independently in accordance with each recording area.

Embodiment 7

In a seventh embodiment equalizer for equalizing a signal is provided in a stage previous to the A/D converter.

Figure 13:
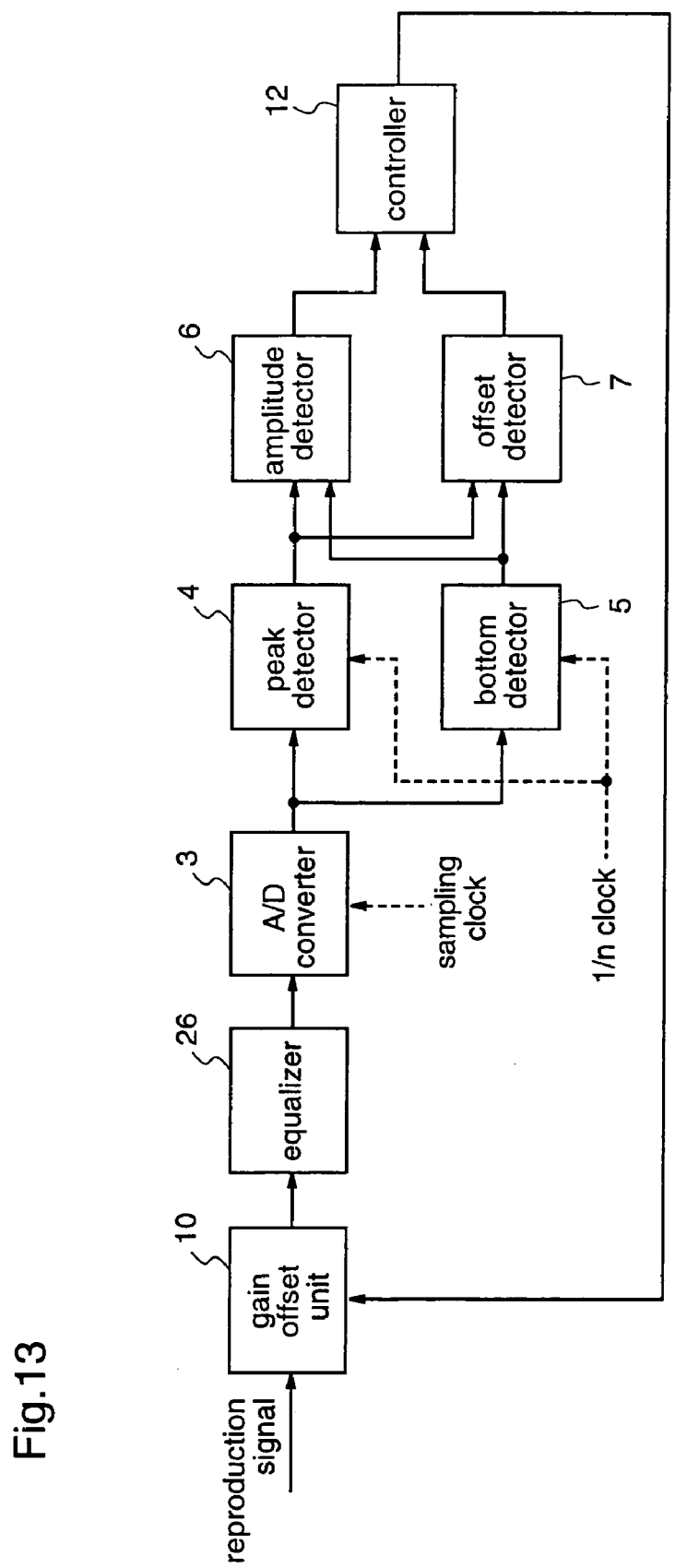
FIG. 13 is a block diagram illustrating a signal processing apparatus according to a seventh embodiment of the invention.

Hereinafter, the seventh embodiment of the present invention will be described in detail with reference to the drawings. FIG. 13 is a block diagram illustrating a signal processing apparatus according to the seventh embodiment.

This signal processing apparatus comprises a gain offset unit 10 which gives a gain based on an inputted gain control signal and a DC offset based on an inputted offset control signal, to an input reproduction signal; an equalizer 26 which receives the output of the gain offset unit 10, and emphasizes high-frequency bands of the signal; an A/D converter 3 which receives the output of the equalizer 26, and subjects the signal to sampling with a clock having a predetermined clock cycle T, and analog-to-digital conversion, thereby to output sampling data; a peak detector 4 which receives the output signal from the A/D converter 3, and performs peak detection with a clock having a cycle n times (n: positive integer) as long as the clock cycle T; a bottom detector 5 which receives the output from the A/D converter 3, and performs bottom detection with a clock having a cycle n times (n: positive integer) as long as the clock cycle T; an amplitude detector 6 which receives the output signals from the peak detector 4 and the bottom detector 5, and calculates a signal amplitude of the input to the A/D converter 3 to output an amplitude information signal; an offset detector 7 which receives the output signals from the peak detector 4 and the bottom detector 5, and calculates a signal offset of the input to the A/D converter 3 to output an offset information signal; and a controller 12 which performs gain control and offset control of the gain offset unit 10 on the basis of the amplitude information signal and the offset information signal, and is able to hold the control operation or switch the control speed on the basis of an externally inputted hold signal.

Next, the operation of the signal processing apparatus according to the seventh embodiment will be described. The gain offset unit 10 gives a gain and an offset based on the control signals to the reproduction signal from the information recording medium, and then the equalizer 26 subjects the signal to waveform equalization. When playing a high-density optical recording medium or the like, since the signal amplitude of a short recording mark is lowered due to optical frequency characteristics, it is necessary to boost up this frequency band by the equalizer 26 to improve the SNR (Signal to Noise Ratio) of the signal. Further, the output signal from the equalizer 26 is sampled with a clock having a predetermined clock cycle T, and converted into a quantified digital signal by the A/D converter 3. Then, the peak detector 4 and the bottom detector 5 perform peak detection and bottom detection from the digital signal, respectively. The peak detection and bottom detection are identical to those described for the first embodiment, and both of them may be carried out with a clock having the same cycle as the predetermined clock cycle T. However, as shown in FIG. 13, both of peak detection and bottom detection may be carried out with a clock having a cycle n times (n: positive integer) as long as the clock cycle T, or peak detection and bottom detection may be respectively carried out with clocks having cycles that are m times and n times (m,n: mutually independent positive integers) as long as the clock cycle T, thereby to reduce power consumption.

Next, the amplitude detector 6 performs amplitude detection and the offset detector 7 performs offset detection, on the basis of the detected peak value and bottom value. The amplitude detection and offset detection are identical to those described for the first embodiment. The controller 12 performs gain/offset control for the gain/offset unit 10 so that the detected amplitude value and offset value become equal to their target values, respectively. The control operation is identical to that described for the first embodiment.

Figure 14:
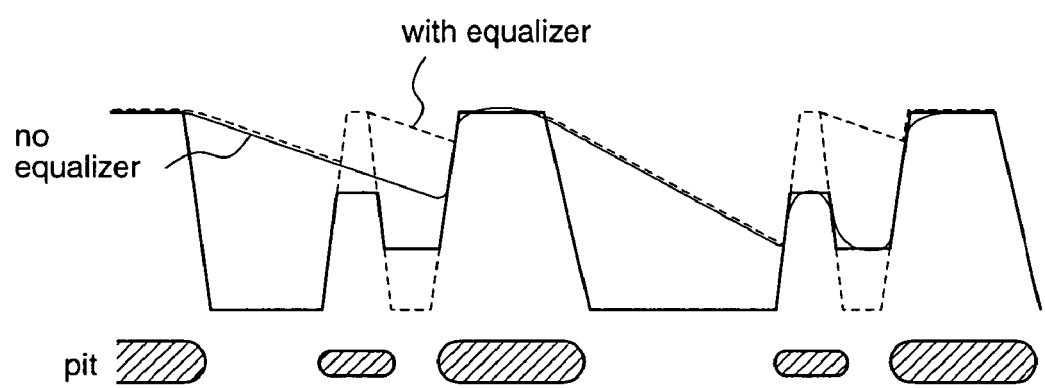
FIG. 14 is a diagram for explaining the effect of the signal processing apparatus according to the seventh embodiment.

Although it is desirable that the signal should be input to the equalizer 26 at the maximum amplitude within the dynamic range of the equalizer 26 from the viewpoint of the SNR, since the equalizer 26 is placed before the A/D converter 3 in this seventh embodiment, the input signal amplitude and the input signal offset to the equalizer 26 can be controlled to be constant, whereby the signal amplitude and the input signal offset can be kept constant. Thereby, the maximum SNR can be attained, and it becomes unnecessary to consider a margin for a deviation such as a circuit offset that occurs in the stage previous to the equalizer 26, whereby the signal can be input to the equalizer 26 at the maximum amplitude within the dynamic range of the equalizer 26. Further, as shown in FIG. 14, when the signal amplitude is not increased due to a short pit formed on the optical disc, the signal does not attain the saturated amplitude as shown by the solid line in FIG. 14. If there is no equalizer, a peak (or a bottom) of the input reproduction signal due to this short pit cannot be correctly detected. However, since the equalizer 26 is provided in this seventh embodiment, the signal attains the saturated state as shown by the dashed line in FIG. 14 even when the pit length is short, whereby peak detection (or bottom detection) can be carried out correctly, resulting in an increase in precision of gain control or offset control.

Embodiment 8

In an eighth embodiment the gain offset unit according to the seventh embodiment is divided into two sub-blocks, and an equalizer is placed between them.

Figure 15:
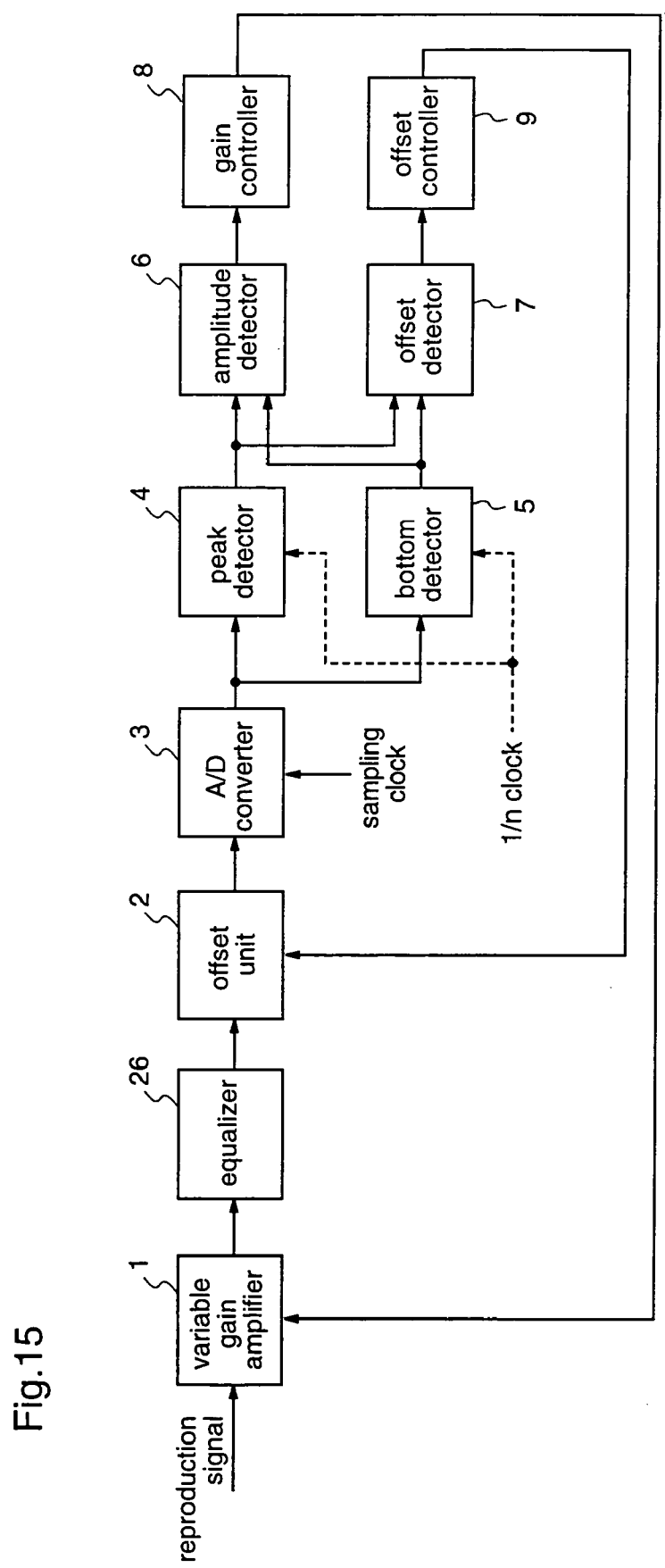
FIG. 15 is a block diagram illustrating a signal processing apparatus according to an eighth-embodiment of the invention.

Hereinafter, the eighth embodiment of the invention will be described in detail with reference to the drawings. FIG. 15 is a block diagram illustrating a signal processing apparatus according to the eighth embodiment.

The signal processing apparatus comprises a variable gain amplifier 1 which gives a gain based on an inputted gain control signal to an input reproduction signal; an equalizer 26 which receives the output of the variable gain amplifier 1, and emphasizes high frequency bands of the input signal; an offset unit 2 which receives the output of the equalizer 26, and gives a DC offset based on an inputted offset control signal to the input signal; an A/D converter 3 which receives the output of the offset unit 2, subjects the signal to sampling with a clock having a predetermined clock cycle T, and analog-to-digital conversion, thereby to output sampling data; a peak detector 4 which receives the output of the A/D converter 3, and subjects the signal to peak detection with a clock having a cycle n times (n: positive integer) as long as the clock cycle T; a bottom detector 5 which receives the output of the A/D converter 3, and subjects the signal to bottom detection with a clock having a cycle n times (n: positive integer) as long as the clock cycle T; an amplitude detector 6 which receives the outputs of the peak detector 4 and the bottom detector 5, and calculates a signal amplitude of the input to the A/D converter 3 to output an amplitude information signal; an offset detector 7 which receives the outputs of the peak detector 4 and the bottom detector 5, and calculates a signal offset of the input to the A/D converter 3 to output an offset information signal; a gain controller 8 which controls the variable gain amplifier 1 on the basis of a result of comparison between the amplitude information signal and a target amplitude value; and an offset controller 9 which controls the offset unit 2 on the basis of a result of comparison between the offset information signal and a target offset value.

The variable gain amplifier 1 and the offset unit 2 correspond to the gain offset unit 10 of the seventh embodiment, and the gain controller 8 and the offset controller 9 correspond to the controller 12 of the seventh embodiment.

Next, the operation of the eighth embodiment will be described. The variable gain amplifier 1 gives a gain based on the inputted gain control signal to a reproduction signal from the information recording medium, and the equalizer 26 subjects the reproduction signal to waveform equalization, and thereafter, the offset unit 2 gives an offset based on an inputted offset control signal to the reproduction signal.

When playing a high-density optical recording medium or the like, since the signal amplitude of a short recording mark is undesirably lowered due to optical frequency characteristics, it is necessary to boost up this frequency band with the equalizer 26 to improve the SNR (Signal to Noise Ratio) of the signal. Further, the output signal from the equalizer 26 is sampled with a clock having a predetermined clock cycle T by the A/D converter 3 and then converted into a quantified digital signal. The peak detector 4 and the bottom detector 5 perform peak detection and bottom detection from this digital signal, respectively. The peak detection and bottom detection are identical to those described for the first embodiment, and both of them may be performed with a clock having the same cycle as the predetermined clock cycle T. Alternatively, as shown in FIG. 15, both of peak detection and bottom detection may be carried out with a clock having a cycle that is n times (n: positive integer) as long as the clock cycle T, or peak detection and bottom detection may be respectively carried out with clocks having cycles that are m times and n times (m,n: mutually independent positive integers) as long as the clock cycle T, thereby to reduce power consumption.

Next, the amplitude detector 6 performs amplitude detection and the offset detector 7 performs offset detection, on the basis of the detected peak value and the detected bottom value. The amplitude detection and offset detection are identical to those described for the first embodiment. Further, the gain and offset control operations of the gain controller 8 and the offset controller 9 are identical to those described for the second embodiment.

While it is desired that the signal should be input to the equalizer 26 at the maximum amplitude within the dynamic range of the equalizer 26 from the viewpoint of the SNR, since the equalizer 26 is placed after the variable gain amplifier 1 in this eighth embodiment, the signal amplitude can be controlled to be constant, and it becomes unnecessary to consider a margin for a circuit gain deviation that occurs at the stage previous to the equalizer 26, whereby the signal can be input to the equalizer 26 at the maximum amplitude within the dynamic range of the equalizer 26. Further, since the equalizer 26 is provided in this eighth embodiment, the signal attains the saturated state as shown by the dashed line in FIG. 14 even when the pit length is short, whereby peak detection (or bottom detection) can be carried out correctly, resulting in an increase in precision of gain control or offset control.

Embodiment 9

In a ninth embodiment the offset unit and the equalizer are interchanged.

Figure 16:
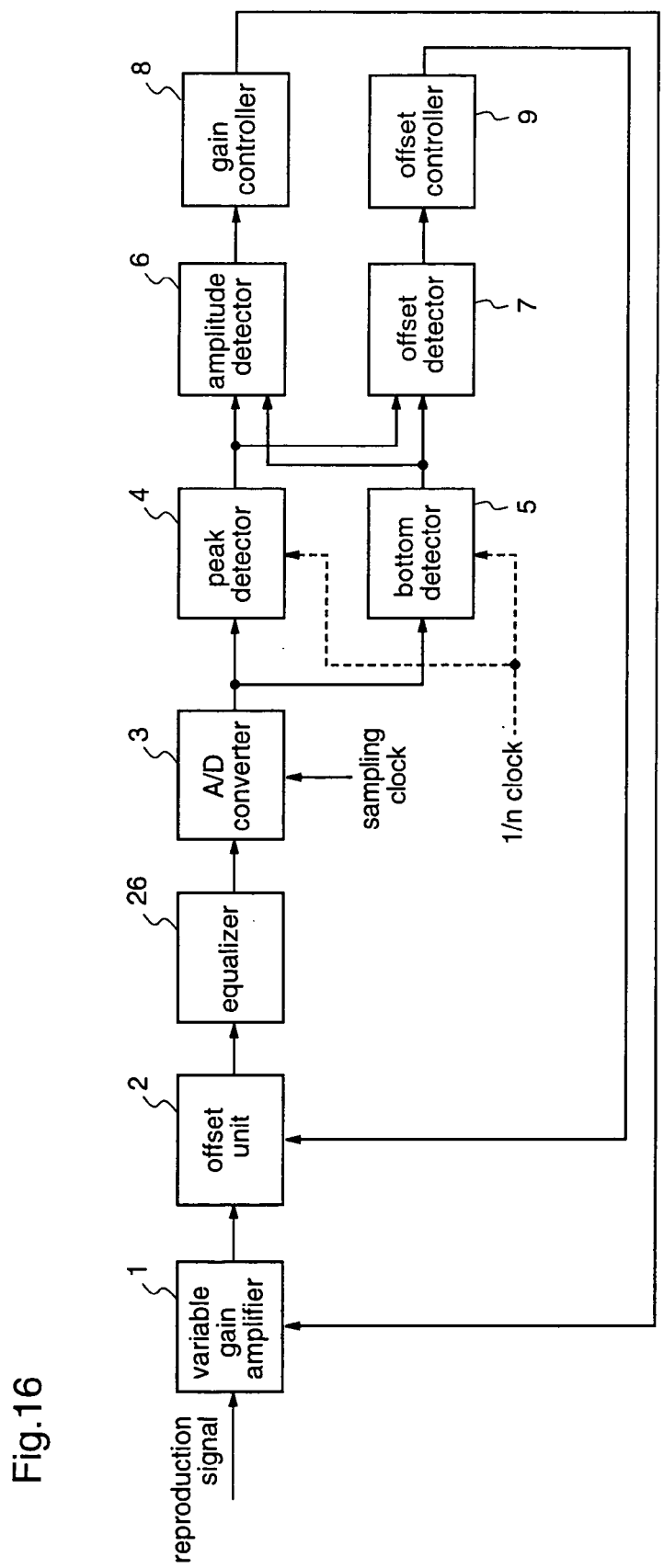
FIG. 16 is a block diagram illustrating a signal processing apparatus according to a ninth embodiment of the invention.

Hereinafter, the ninth embodiment will be described in detail with reference to the drawings. FIG. 16 is a block diagram illustrating a signal processing apparatus according to the ninth embodiment.

This signal processing apparatus comprises a variable gain amplifier 1 which gives a gain based on an inputted gain control signal to an inputted reproduction signal; an offset unit 2 which receives the output of the variable gain amplifier 1, and gives a DC offset based on an inputted offset control signal to the input signal; an equalizer 26 which receives the output of the offset unit 2, and emphasizes high frequency bands of the input signal; an A/D converter 3 which receives the output of the equalizer 26, and subjects the signal to sampling with a clock having a predetermined clock cycle T, and analog-to-digital conversion, thereby to output sampling data; a peak detector 4 which receives the output of the A/D converter 3, and subjects the signal to peak detection with a clock having a cycle n times (n: positive integer) as long as the clock cycle T; a bottom detector 5 which receives the output of the A/D converter 3, and subjects the signal to bottom detection with a clock having a cycle n times (n: positive integer) as long as the clock cycle T; an amplitude detector 6 which receives the outputs of the peak detector 4 and the bottom detector 5, and calculates a signal amplitude of the input to the A/D converter 3 to output an amplitude information signal; an offset detector 7 which receives the outputs of the peak detector 4 and the bottom detector 5, and calculates a signal offset of the input signal to the A/D converter 3 to output an offset information signal; a gain controller 8 which controls the variable gain amplifier 1 on the basis of a result of comparison between the amplitude information signal and a target amplitude value; and an offset controller 9 which controls the offset unit 2 on the basis of a result of comparison between the offset information signal and a target offset value.

The variable gain amplifier 1 and the offset unit 2 correspond to the gain offset unit 10 of the seventh embodiment, and the gain controller 8 and the offset controller 9 correspond to the controller 12 of the seventh embodiment.

Next, the operation of the signal processing apparatus according to the ninth embodiment will be described. The variable gain amplifier 1 gives a gain based on the gain control signal to the reproduction signal from the information recording medium, and the offset unit 2 gives an offset based on the offset control signal to the reproduction signal, and thereafter, the equalizer 26 subjects the signal to waveform equalization. When playing a high-density optical recording medium or the like, since the signal amplitude of a short recording mark is undesirably lowered due to optical frequency characteristics, it is necessary to boost up this frequency band with the equalizer 26 to improve the SNR (Signal to Noise Ratio) of the signal. Further, the output signal from the equalizer 26 is sampled with a clock having a predetermined clock cycle T and then converted into a quantified digital signal by the A/D converter 3. The peak detector 4 and the bottom detector 5 perform peak detection and bottom detection from this digital signal, respectively. The peak detection and bottom detection are identical to those described for the first embodiment, and both of them may be carried out with a clock having the same cycle as the predetermined clock cycle T. Alternatively, as shown in FIG. 16, both of them may be carried out with a clock having a cycle that is n times (n: positive integer) as long as the clock cycle T, or peak detection and bottom detection may be respectively carried out with clocks having cycles that are m times and n times (m,n: mutually independent positive integers) longer than the clock cycle T, thereby to reduce power consumption.

Next, the amplitude detector 6 and the offset detector 7 perform amplitude detection and offset detection, respectively, on the basis of the detected peak value and bottom value. The amplitude detection and offset detection are identical to those described for the first embodiment. Further, the gain and offset control operations of the gain controller 8 and the offset controller 9 are identical to those described for the second embodiment.

While it is desired that the signal should be input to the equalizer 26 at the maximum amplitude within the dynamic range of the equalizer 26 from the viewpoint of the SNR, since the equalizer 26 is placed before the A/D converter 3 in this ninth embodiment, the signal amplitude and offset can be controlled to be constant, and it becomes unnecessary to consider margins for gain and offset deviations that occur at the stage previous to the equalizer 26, whereby the signal can be input to the equalizer 26 at the maximum amplitude within the dynamic range of the equalizer 26. Further, since the equalizer 26 is provided in this ninth embodiment, the signal attains the saturated state as shown by the dashed line in FIG. 14 even when the pit length is short, whereby peak detection (or bottom detection) can be carried out correctly, resulting in an increase in precision of gain control or offset control.

Embodiment 10

In a tenth embodiment of the present invention a servo controller is provided.

Hereinafter, the tenth embodiment of the present invention will be described in detail with reference to the drawings.

Figure 19B:
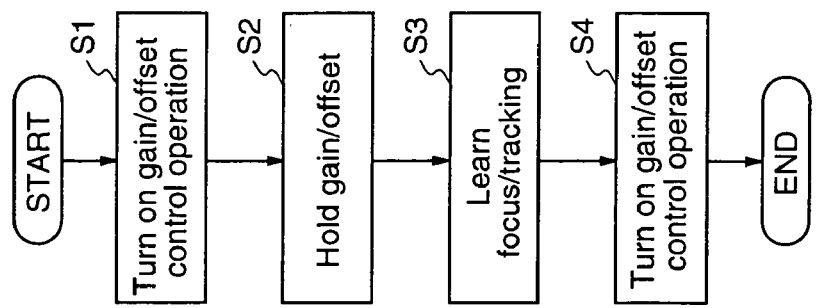
Figure 19A:
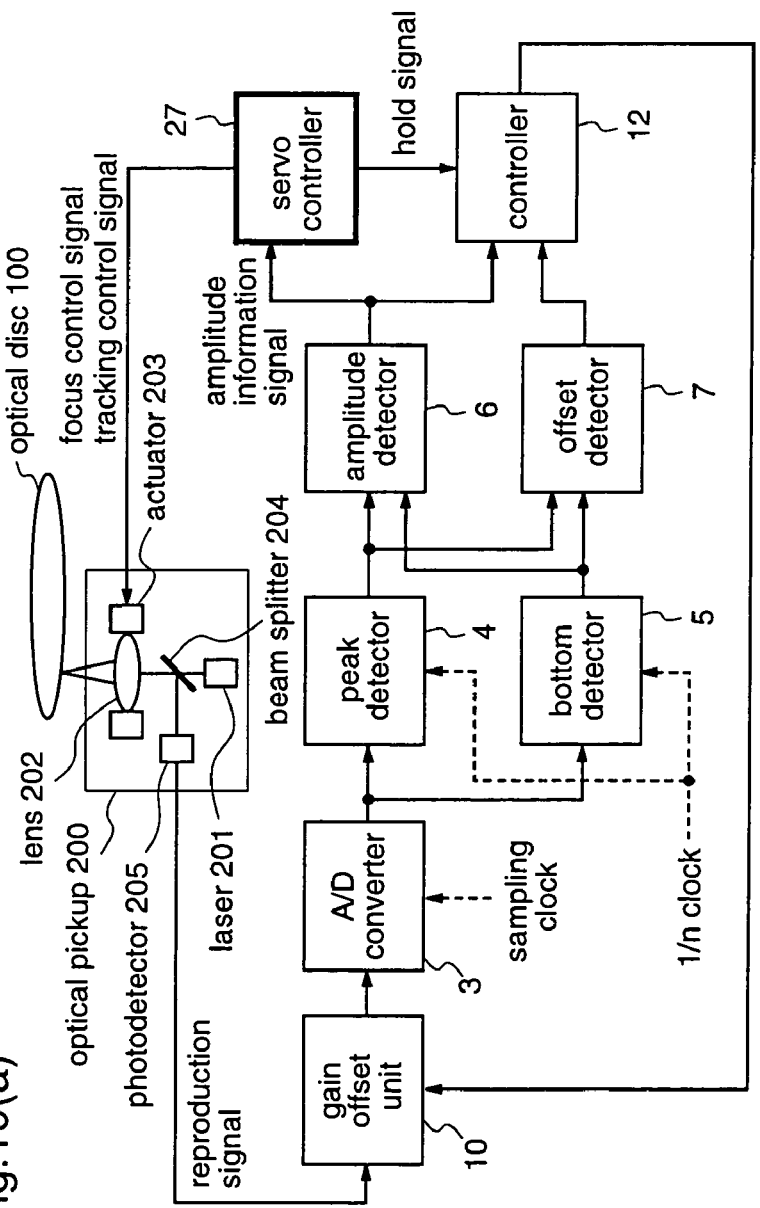
Figure 20:
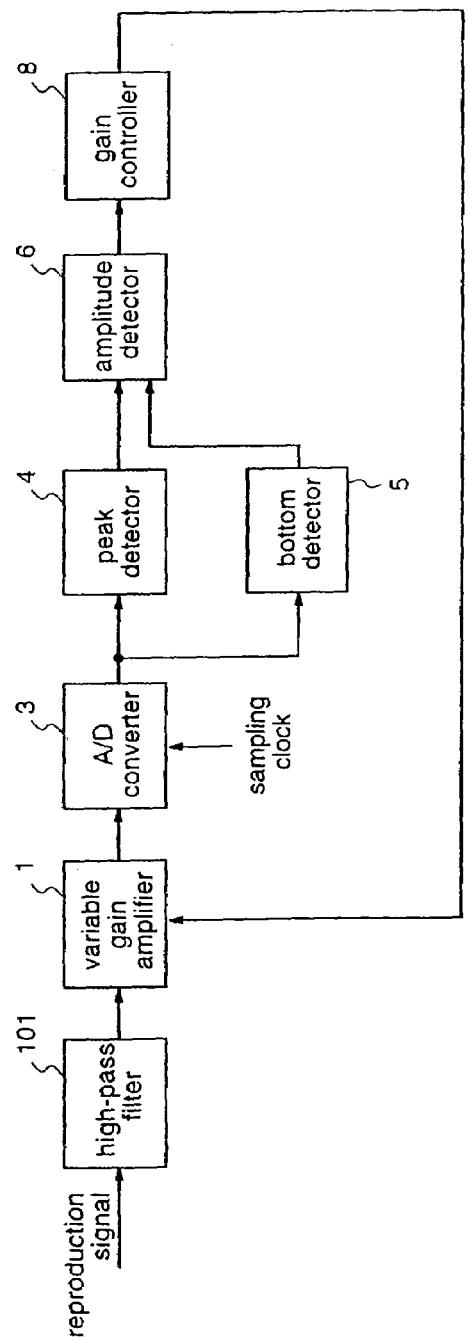
FIG. 20 is a block diagram illustrating a signal processing apparatus according to a first prior art.
Figure 22:
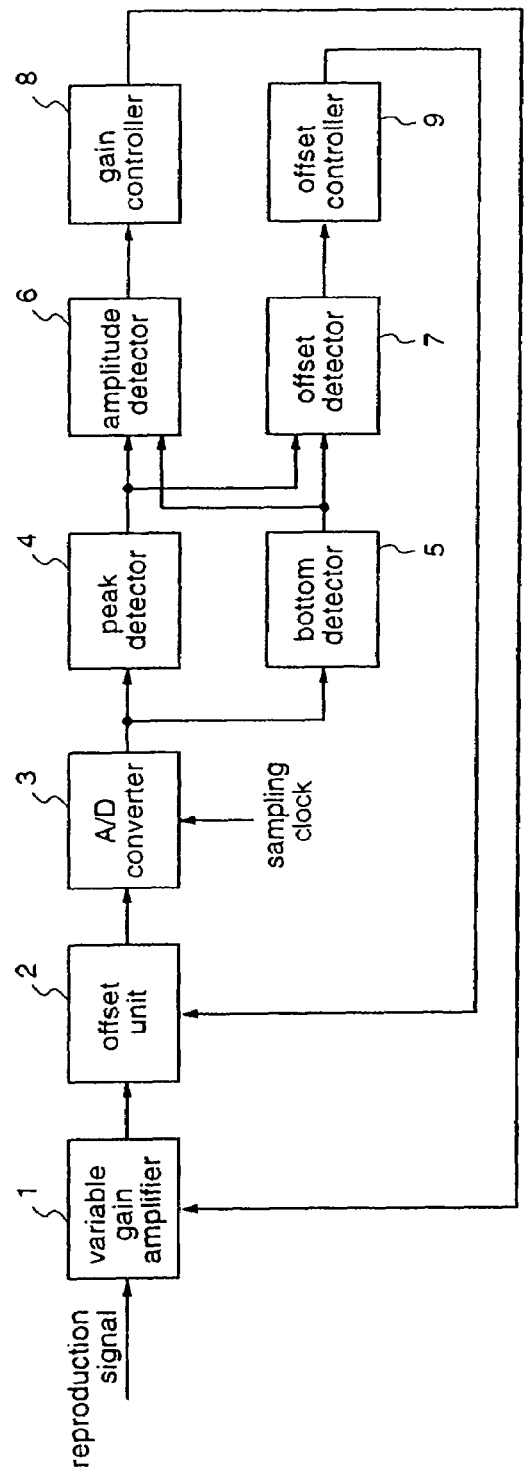
FIG. 22 is a block diagram illustrating a signal processing apparatus according to a second prior art.

FIG. 19(a) is a block diagram illustrating a signal processing apparatus according to the tenth embodiment.

Although the fundamental structure of this signal processing apparatus is identical to that of the first embodiment, the apparatus according to this tenth embodiment further includes a servo controller 27 which receives the output signal from the amplitude detector 6, and learns the focus control position or tracking control position of a pickup on the basis of the reproduction signal amplitude information. FIG. 19(a) is a schematic diagram of an optical disc device including the signal processing apparatus, and an optical disc 100 as an information recording medium is driven by a spindle motor (not shown). Further, an optical pickup 200 for reading data from the optical disc 100 comprises a laser 201 for emitting a laser beam to irradiate the optical disc 100 with the laser beam; a beam splitter 204 for separating the path of the laser beam emitted from the laser 201 from the path of the laser beam reflected at the optical disc 100; a lens 202 for focusing the laser beam that has passed through the beam splitter 204, onto an information surface of the optical disc 100; an actuator 203 for driving the lens 202 on the basis of a focus control signal and a tracking control signal from the servo controller 27; and a photodetector 205 for light-to-electricity converting the reflected laser beam from the optical disc 100, which has passed through the beam splitter 204, to output a reproduction signal to the gain offset unit 10.

In order to read pit string information recorded on an optical disc or the like, it is necessary to perform focus control, tracking control, or the like. However, since an optimum control position varies due to optical variations or electric offsets, learning of a control position must be carried out to ensure a favorable reproduction state. As an example of a learning method, there is a method of maximizing the reproduction signal amplitude, a method of minimizing the jitter, or the like. In order to perform learning to maximize the reproduction signal amplitude, a change in the input reproduction signal must be reflected as amplitude information to be output from the amplitude detector 6.

To be specific, as shown in FIG. 19(b), initially, the servo controller 27 controls the controller 12 to turn on gain control and offset control, thereby to make the signal amplitude constant and secure resolution for A/D conversion (step S1). Next, the servo controller 17 instructs the controller 12 to hold gain control (step S2). In the stage where these preparations have been completed, the servo controller 27 instructs the controller 12 to perform focus and tracking learning, for example, learning to maximize the signal amplitude (step S3). In the stage where the learning has been completed, the servo controller 27 controls the controller 12 to start gain and offset control again.

As described above, during the learning period, the amplitude change in the input reproduction signal is transferred as it is to the output of the amplitude detector by compulsorily holding gain control. Further, the amplitude detection operation can be stabilized by holding offset control simultaneously with gain control.

Furthermore, gain control and offset control are carried out before learning, and learning operation is started after the both controls are completed, whereby the signal amplitude at the input of the A/D converter can be made approximately constant regardless of the input reproduction signal amplitude, and the sensitivity of learning can be kept constant. For example, the reflectivity of DVD-RW media is as low as ¼ to ⅕ of the reflectivity of DVD-RW media, and the input reproduction signal amplitude becomes smaller, and therefore, the output from the amplitude detector also becomes smaller, resulting in a problem that learning sensitivity cannot be obtained. In this tenth embodiment, however, gain control and offset control are carried out before learning, and the both controls are held to perform learning after setting the input signal amplitude of the A/D converter 3 to a predetermined value. Therefore, it becomes unnecessary to consider the analog input amplitude variation, resulting in stable learning.

APPLICABILITY IN INDUSTRY

As described above, according to the signal processing apparatus of the present invention, when subjecting an analog reproduction signal that is read from an information recording medium, such as an optical disc, to A/D conversion and signal processing, it is possible to suppress the phenomenon in which the reproduction signal exceeds the dynamic range of the A/D converter after passing through the signal dropout portion of the information recording medium, whereby stable A/D conversion can be carried out, and data error which occurs after passing the defect can be minimized. Further, because dropout detection accuracy is improved, reliability of an optical disc device using this signal processing apparatus can be improved.

The invention claimed is:

1. A signal processing apparatus for reproducing information recorded on an information recording medium, comprising:
 a gain offset unit for giving a gain and a DC offset to an inputted reproduction signal, wherein the gain is based on an inputted gain control signal and the DC offset is based on an inputted offset control signal;
 an A/D converter for receiving the output of the gain offset unit, sampling the input signal with a clock having a predetermined clock cycle T, and analog-to-digital converting the signal, thereby to output sampling data;
 a peak detector for receiving the output of the A/D converter, and performing peak detection with a clock having a cycle that is m times as long as the clock cycle T, wherein m is a positive integer;
 a bottom detector for receiving the output of the A/D converter, and performing bottom detection with a clock having a cycle that is n times as long as the clock cycle T, wherein n is a positive integer;
 an amplitude detector for receiving the output of the peak detector and the output of the bottom detector, and calculating a signal amplitude of the input to the A/D converter as an amplitude information signal;
 an offset detector for receiving the output of the peak detector and the output of the bottom detector, and calculating a signal offset of the input to the A/D converter as an offset information signal; and
 a controller for performing gain control and offset control of the gain offset unit based on the amplitude information signal and the offset information signal, A/D controller being able operable to hold the control operation of the controller or change the control speed of the controller according to an inputted hold signal;
 wherein the signal amplitude and offset of the input to the A/D converter are kept approximately constant regardless of local fluctuations in the inputted reproduction signal.

2. A signal processing apparatus as defined in claim 1 further comprising:
 a dropout detector for receiving at least one of the output of the A/D converter, the output of the bottom detector, the output of the offset detector, and the amplitude information signal, detecting a dropout in the input signal, and selectively outputting the hold signal based on detecting of a dropout;
 wherein the hold signal enables holding of the control operation or changing of the control speed of the controller.

3. A signal processing apparatus for reproducing information recorded on an information recording medium, comprising:
 a variable gain amplifier for giving a gain based on an inputted gain control signal to an inputted reproduction signal;
 an offset unit for receiving the output of the variable gain amplifier, and applying a DC offset based on an inputted offset control signal to the input signal;
 an A/D converter for receiving the output of the offset unit, sampling the input signal with a clock having a predetermined clock cycle T, and analog-to-digital converting the signal, thereby to output sampling data;
 a peak detector for receiving the output of the A/D converter, and performing peak detection using a clock having a cycle that is m times as long as the clock cycle T, wherein m is a positive integer;
 a bottom detector for receiving the output of the A/D converter, and performing bottom detection using a clock having a cycle that is n times as long as the clock cycle T, wherein n is a positive integer;
 an amplitude detector for receiving the output of the peak detector and the output of the bottom detector, and calculating a signal amplitude of the input to the A/D converter as an amplitude information signal;
 an offset detector for receiving the output of the peak detector and the output of the bottom detector, and calculating a signal offset of the input to the A/D converter as an offset information signal;
 a gain controller for controlling the variable gain amplifier based on a result of comparison between the amplitude information signal and a target amplitude value, said controller being operable to hold the gain control operation of the gain controller or change the control speed of the gain controller according to an inputted hold signal;
 an offset controller for controlling the offset unit based on a result of comparison between the offset information signal and a target offset value, said controller being operable to hold the offset control operation of the offset controller or change the control speed of the offset controller according to the inputted hold signal;

wherein the signal amplitude and offset of the input to the A/D converter are kept approximately constant regardless of local fluctuations in the input reproduction signal.

4. A signal processing apparatus as defined in claim 3 further comprising:

a dropout detector for receiving at least one of the output of the A/D converter, the output of the peak detector, the output of the bottom detector, the output of the offset detector, and the amplitude information signal, detecting a dropout in the input signal, and selectively outputting the hold signal based on detecting of a dropout;

wherein the hold signal enables at least one of: holding the gain control operation of the gain controller, holding the offset control operation of the offset controller, changing the control speed of the gain controller, and changing the control speed of the offset controller.

5. A signal processing apparatus for reproducing information recorded on an information recording medium, comprising:

a gain offset unit for giving a gain and a DC offset to an inputted reproduction signal, wherein the gain is based on an inputted gain control signal and the DC offset is based on an inputted offset control signal;

an A/D converter for receiving the output of the gain offset unit, sampling input signal with a clock having a predetermined clock cycle T, and analog-to-digital converting the signal, thereby to output sampling data;

a peak detector for receiving the output of the A/D converter, and performing peak detection using a clock having a cycle that is m times as long as the clock cycle T, wherein m is a positive integer;

a bottom detector for receiving the output of the A/D converter, and performing bottom detection using a clock having a cycle that is n times as long as the clock cycle T, wherein n is a positive integer;

an amplitude detector for receiving the output of the peak detector and the output of the bottom detector, and calculating a signal amplitude of the input to the A/D converter as an amplitude information signal;

an offset detector for receiving the output of the peak detector and the output of the bottom detector, and calculating a signal offset of the input to the A/D converter as an offset information signal; and a controller for performing gain control and offset control of the gain offset unit based on the amplitude information signal and the offset information signal; and a PLL unit for generating a clock that is phase-locked with the sampling data outputted from the A/D converter;

wherein the signal amplitude and offset of the input to the A/D converter are kept approximately constant, and the response characteristic of the controller is kept constant regardless of the reproduction speed.

6. A signal processing apparatus as defined in claim 5, wherein a hold signal enables holding of the control operation of the controller, or changing of the control speed of the controller, or holding of the PLL control operation of the PLL unit.

7. A signal processing apparatus as defined in claim 5 further comprising:

a dropout detector for receiving at least one of the output of the A/D converter, the output of the bottom detector, the output of the offset detector, and the amplitude information signal, detecting a dropout in the input signal, and selectively outputting a hold signal based on detecting of a dropout;

wherein the hold signal enables holding of the control operation of the controller, or changing of the control speed of the controller, or holding of the PLL control operation of the PLL unit.

8. A signal processing apparatus for reproducing information recorded on an optical disc recording medium which is divided into plural areas, comprising:

a gain offset unit for giving a gain and a DC offset to an inputted reproduction signal, wherein the gain is based on an inputted gain control signal and the DC offset is based on an inputted offset control signal;

an A/D converter for receiving the output of the gain offset unit and a clock having a predetermined clock cycle T, sampling the input signal with the clock, and analog-to-digital converting the signal, thereby to output sampling data;

a peak detector for receiving the output of the A/D converter, and performing peak detection; a bottom detector for receiving the output of the A/D converter, and performing bottom detection;

an amplitude detector for receiving the output of the peak detector and the output of the bottom detector, and calculating a signal amplitude of the input to the A/D converter as an amplitude information signal;

an offset detector for receiving the output of the peak detector and the output of the bottom detector, and calculating a signal offset of the input to the A/D converter as an offset information signal;

a gate generator for receiving a second reproduction signal, and recognizing area information on the optical disc recording medium to generate a gate signal indicating present area information; and a controller for performing gain control and offset control of the gain offset unit based on the amplitude information signal and the offset information signal, said gain control and offset control being performed independently for each recording area according to the gate signal;

wherein the signal amplitude and offset of the input to the A/D converter are kept approximately constant independently of the recording area.

9. A signal processing apparatus for reproducing information recorded on an optical disc recording medium which is divided into plural areas, comprising:

a variable gain amplifier for giving a gain based on an inputted gain control signal to an inputted first reproduction signal;

an offset unit for receiving the output of the variable gain amplifier, and giving a DC offset based on an inputted offset control signal to the input signal;

an A/D converter for receiving the output of the offset unit and a clock having a predetermined clock cycle T, sampling the input signal using the clock, and analog-to-digital converting the signal, thereby to output sampling data;

a peak detector for receiving the output of the A/D converter, and performing peak detection using a clock having a cycle that is m times as long as the clock cycle T, wherein m is a positive integer;

a bottom detector for receiving the output of the A/D converter, and performing bottom detection using a clock having a cycle that is n times as long as the clock cycle T, wherein n is a positive integer;

an amplitude detector for receiving the output of the peak detector and the output of the bottom detector, and calculating a signal amplitude of the input to the A/D converter as an amplitude information signal;
an offset detector for receiving the output of the peak detector and the output of the bottom detector, and calculating a signal offset of the input to the A/D converter as an offset information signal;
a gate generator for receiving a second reproduction signal, and recognizing area information on the optical disc recording medium to generate a gate signal indicating present area information;
a gain controller for controlling the variable gain amplifier based on a result of comparison between the amplitude information signal and a target amplitude value, said controller performing independent amplitude control for each recording area according to the gate signal;
at least one gain storage unit for holding gain control values outputted from the gain controller; and
an offset controller for controlling the offset unit based on a result of comparison between the offset information signal and the target offset value;
wherein the signal amplitude and offset at the input of the A/D converter are kept approximately constant independently of the recording area.

10. A signal processing apparatus for reproducing information recorded on an optical disc recording medium which is divided into plural areas, comprising:
a variable gain amplifier for giving a gain based on an inputted gain control signal to an inputted first reproduction signal;
an offset unit for receiving the output of the variable gain amplifier, and giving a DC offset based on an inputted offset control signal to the input signal;
an A/D converter for receiving the output of the offset unit and a clock having a predetermined clock cycle T, sampling the signal using the clock, and analog-to-digital converting the signal, thereby to output sampling data;
a peak detector for receiving the output of the A/D converter, and performing peak detection using a clock having a cycle that is m times as long as the clock cycle T, wherein m is a positive integer;
a bottom detector for receiving the output of the A/D converter, and performing bottom detection using a clock having a cycle that is n times as long as the clock cycle T, wherein n is a positive integer;
an amplitude detector for receiving the output of the peak detector and the output of the bottom detector, and calculating a signal amplitude of the input to the A/D converter as an amplitude information signal;
an offset detector for receiving the output of the peak detector and the output of the bottom detector, and calculating a signal offset of the input to the A/D converter as an offset information signal;
a gate generator for receiving a second reproduction signal, and recognizing area information on the optical disc recording medium to generate a gate signal indicating present area information;
a gain controller for controlling the variable gain amplifier based on a result of comparison between the amplitude information signal and a target amplitude value;
an offset controller for controlling the offset unit based on a result of comparison between the offset information signal and a target offset value, said offset controller being able to perform independent offset control for each recording area based on the gate signal; and
at least one offset storage unit for holding offset control values outputted from the offset controller;
wherein the signal amplitude and offset at the input of the A/D converter are kept approximately constant independently of the recording area.

11. A signal processing apparatus for reproducing information recorded on an optical disc recording medium which is divided into plural areas, comprising:
a variable gain amplifier for giving a gain based on an inputted gain control signal to an inputted first reproduction signal;
an offset unit for receiving the output of the variable gain amplifier, and giving a DC offset based on an inputted offset control signal to the input signal;
an A/D converter for receiving the output of the offset unit and a clock having a predetermined clock cycle T, sampling the input signal using the clock, and analog-to-digital converting the signal, thereby to output sampling data;
a peak detector for receiving the output of the A/D converter, and performing peak detection using a clock having a cycle that is m times as long as the clock cycle T, wherein m is a positive integer;
a bottom detector for receiving the output of the A/D converter, and performing bottom detection using a clock having a cycle that is n times as long as the clock cycle T, wherein n is a positive integer;
an amplitude detector for receiving the output of the peak detector and the output of the bottom detector, and calculating a signal amplitude of the input to the A/D converter as an amplitude information signal;
an offset detector for receiving the output of the peak detector and the output of the bottom detector, and calculating a signal offset of the input to the A/D converter as an offset information signal;
a gate generator for receiving a second reproduction signal, and recognizing area information on the optical disc recording medium to generate a gate signal indicating present area information;
a gain controller for controlling the variable gain amplifier based on a result of comparison between the amplitude information signal and a target amplitude value, said controller performing independent amplitude control for each recording area according to the gate signal;
at least one gain storage unit for holding gain control values outputted from the gain controller;
an offset controller for controlling the offset unit based on a result of comparison between the offset information signal and a target offset value, said controller performing independent offset control for each recording area according to the gate signal; and
at least one offset storage unit for storing offset control values outputted from the offset controller;
wherein the signal amplitude and offset at the input of the A/D converter are kept approximately constant independently of the recording area.

12. A signal processing apparatus for reproducing information recorded on an information recording medium, comprising:
a gain offset unit for giving a gain and a DC offset to an inputted reproduction signal, wherein the gain is based on an inputted gain control signal and the DC offset is based on an inputted offset control signal;
an equalizer for receiving the output of the gain offset unit, and emphasizing high frequency bands of the signal;

an A/D converter for receiving the output of the equalizer, sampling the input signal with a clock having a predetermined clock cycle T, and analog-to-digital converting the signal, thereby to output sampling data;

a peak detector for receiving the output of the A/D converter, and performing peak detection using a clock having a cycle that is m times as long as the clock cycle T, wherein m is a positive integer;

a bottom detector for receiving the output of the A/D converter, and performing bottom detection using a clock having a cycle that is n times as long as the clock cycle T, wherein n is a positive integer;

an amplitude detector for receiving the output of the peak detector and the output of the bottom detector, and calculating a signal amplitude of the input to the A/D converter as an amplitude information signal;

an offset detector for receiving the output of the peak detector and the output of the bottom detector, and calculating a signal offset of the input to the A/D converter as an offset information signal; and a controller for performing gain control and offset control of the gain offset unit based on the amplitude information signal and the offset information signal, said controller holding the control operation of the controller or changing the control speed of the controller according to an inputted hold signal;

wherein the signal amplitude and offset of the reproduction signal at the input of the equalizer are kept approximately constant, and the signal amplitude and offset at the input of the A/D converter are kept approximately constant.

13. A signal processing apparatus for reproducing information recorded on an information recording medium, comprising:

a variable gain amplifier for giving a gain based on an inputted gain control signal to an inputted reproduction signal;

an equalizer for receiving the output of the variable gain amplifier, and emphasizing high frequency bands of the input signal;

an offset unit for receiving the output of the equalizer, and giving a DC offset based on an inputted offset control signal to the input signal;

an A/D converter for receiving the output of the offset unit, sampling the input signal with a clock having a predetermined clock cycle T, and analog-to-digital converting the signal, thereby to output sampling data;

a peak detector for receiving the output of the A/D converter, and performing peak detection using a clock having a cycle that is m times as long as the clock cycle T, wherein m is a positive integer;

a bottom detector for receiving the output of the A/D converter, and performing bottom detection using a clock having a cycle that is n times as long as the clock cycle T, wherein n is a positive integer;

an amplitude detector for receiving output signals from the peak detector and the bottom detector, and calculating a signal amplitude at the input of the A/D converter as an amplitude information signal;

an offset detector for receiving the output of the peak detector and the output of the bottom detector, and calculating a signal offset of the input to the A/D converter as an offset information signal;

a gain controller for controlling the variable gain amplifier based on a result of comparison between the amplitude information signal and a target amplitude value;

an offset controller for controlling the offset unit based on a result of comparison between the offset information signal and a target offset value;

wherein the signal amplitude of the reproduction signal at the input of the equalizer is kept approximately constant, and the signal amplitude and offset at the input of the A/D converter are kept approximately constant.

14. A signal processing apparatus for reproducing information recorded on an information recording medium, comprising:

a variable gain amplifier for giving a gain based on an inputted gain control signal to an inputted reproduction signal;

an offset unit for receiving the output of the variable gain amplifier, and giving a DC offset based on an inputted offset control signal to the input signal;

an equalizer for receiving the output of the offset unit, and emphasizing high frequency bands of the input signal;

an A/D converter for receiving the output of the equalizer, and sampling the input signal with a clock having a predetermined clock cycle T, and analog-to-digital converting the signal, thereby to output sampling data;

a peak detector for receiving the output of the A/D converter, and performing peak detection using a clock having a cycle that is m times as long as the clock cycle T, wherein m is a positive integer;

a bottom detector for receiving the output of the A/D converter, and performing bottom detection using a clock having a cycle that is n times as long as the clock cycle T, wherein n is a Positive integer;

an amplitude detector for receiving the output of the peak detector and the output of the bottom detector, and calculating a signal amplitude of the input to the A/D converter as an amplitude information signal;

an offset detector for receiving the output of the peak detector and the output of the bottom detector, and calculating a signal offset of the input to the A/D converter as an offset information signal;

a gain controller for controlling the variable gain amplifier based on a result of comparison between the amplitude information signal and a target amplitude value; and an offset controller for controlling the offset unit based on a result of comparison between the offset information signal and a target offset value;

wherein the signal amplitudes and offsets of the reproduction signal at the input of the equalizer and at the input of the A/D converter are kept approximately constant, respectively.

15. A signal processing apparatus as defined in claim 1, wherein the reproduction signal is directly inputted to the A/D converter without performing the internal processing of the gain offset unit.

16. A signal processing apparatus as defined in claim 3, wherein the reproduction signal is directly inputted to the A/D converter without performing the internal processing of the gain offset unit.

17. A signal processing apparatus as defined in claim 8, wherein the first reproduction signal is a sum signal of detection signals outputted from a photodetector which is divided into plural parts, in an optical pickup which reproduces the information recorded on the information recording medium; and the second reproduction signal is a difference signal between detection outputs from photodetectors corresponding to the inner circumference and outer circumference of the information recording medium across a recording track on the medium.

18. A signal processing apparatus as defined in claim 3, wherein the gain controller or the offset controller comprises:
   - a comparator for comparing the input signal to the controller with a predetermined target value;
   - an integration counter which can be switched between up count and down count based on the polarity of the output signal from the comparator; and
   - a D/A converter for receiving the output signal from the integration counter, and subjecting the signal to digital-to-analog conversion.

19. A signal processing apparatus as defined in claim 2, wherein
   the dropout detector outputs, as a detection signal, a signal obtained by binarizing the output signal from the peak detector with a predetermined level.

20. A signal processing apparatus as defined in claim 2, wherein
   the dropout detector outputs, as a detection signal, a signal obtained by binarizing the output signal from the amplitude detector with a predetermined level.

21. A signal processing apparatus as defined in claim 1 further comprising:
   a servo controller for receiving the output signal from the amplitude detector, learning a focus control position or a tracking control position of a pickup which reproduces the signal recorded on the information recording medium, and outputting the hold signal during learning;
   wherein at least one of gain control and offset control is compulsorily held while learning is carried out.

22. A signal processing apparatus as defined in claim 1 further comprising:
   a servo controller for receiving the output signal from the amplitude detector, and learning a focus control position or a tracking control position of a pickup which reproduces the signal recorded on the information recording medium;
   wherein at least one of gain control and offset control is carried out before learning, and at least one of gain control and offset control is compulsorily held during learning.

23. A signal processing method comprising:
   detecting a peak value from a signal read from an information recording medium;
   detecting a bottom value from the signal read from the information recording medium;
   calculating, as an amplitude information signal, a signal amplitude based on the peak value and the bottom value;
   detecting a dropout from the signal read from the information recording medium; and controlling the amplitude of the input signal based on the amplitude information signal;
   wherein, during dropout detection, the amplitude control for the input signal is held, or the control speed of said controlling is lowered.

24. A signal processing method comprising:
   detecting a peak value from a signal read from an information recording medium;
   detecting a bottom value from the signal read from the information recording medium;
   calculating, as an offset information signal, a signal offset based on the peak value and the bottom value;
   detecting a dropout from the signal read from the information recording medium; and
   controlling the offset of the input signal based on the offset information signal;
   wherein, during dropout detection, the offset control for the input signal is held, or the control speed of said controlling is lowered.

* * * * *